US012769948B2

(12) United States Patent
Dey et al.

(10) Patent No.: US 12,769,948 B2
(45) Date of Patent: Oct. 20, 2026

(54) GRAPH-DIRECTED KEY PHRASE RECOMMENDATION BASED ON ITEM SIMILARITY

(71) Applicant: eBay Inc., San Jose, CA (US)

(72) Inventors: Soumik Dey, San Jose, CA (US); Hansi Wu, Cupertino, CA (US); Binbin Li, Cupertino, CA (US); Ashirbad Mishra, State College, PA (US); Jinyu Zhao, San Jose, CA (US); Kamesh Madduri, State College, PA (US); Julie Cheng, Los Gatos, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 18/987,594

(22) Filed: Dec. 19, 2024

(65) Prior Publication Data

US 2025/0322016 A1 Oct. 16, 2025

Related U.S. Application Data

(60) Provisional application No. 63/633,430, filed on Apr. 12, 2024.

(51) Int. Cl.
*G06F 16/901* (2019.01)
*G06F 40/284* (2020.01)
(Continued)

(52) U.S. Cl.
CPC ........ *G06F 40/289* (2020.01); *G06F 16/9024* (2019.01); *G06F 40/284* (2020.01); *G06N 20/00* (2019.01)

(58) Field of Classification Search
CPC .................................................. G06F 16/9024
(Continued)

(56) References Cited

U.S. PATENT DOCUMENTS

| | | | | |
|---|---|---|---|---|
| 7,428,529 | B2 | 9/2008 | Zeng et al. | |
| 8,832,091 | B1 * | 9/2014 | Bhagat ................ | G06F 16/9024 707/723 |

(Continued)

FOREIGN PATENT DOCUMENTS

| | | | |
|---|---|---|---|
| CN | 110008309 | B | 3/2021 |
| EP | 2306333 | A1 | 4/2011 |
| JP | 2023176014 | A | 12/2023 |

OTHER PUBLICATIONS

Kelong Mao et al. SIGIR '20, Jul. 25-30, 2020, Virtual Event, All Pages. (Year: 2020).*

(Continued)

*Primary Examiner* — Amy Ng
*Assistant Examiner* — Antonio J Caiado
(74) *Attorney, Agent, or Firm* — FIG. 1 Patents

(57) ABSTRACT

A dataset is received that includes items listed via a listing platform, titles of the items, and key phrases. Each of the items are paired with one or more of the key phrases in the dataset. A data structure is constructed that maps tokens of the titles to the items associated with the titles, and maps the items to the key phrases that are paired with the items in the dataset. A seed title of a seed item is received as listed via the listing platform, and the seed title includes seed tokens. One or more similar items to the seed item are identified based on occurrence counts of the one or more seed tokens that map to the one or more similar items in the data structure. At least one recommended key phrase is output that maps to the one or more similar items in the data structure.

20 Claims, 7 Drawing Sheets

(51) Int. Cl.
*G06F 40/289* (2020.01)
*G06N 20/00* (2019.01)

(58) Field of Classification Search
USPC .......................................................... 707/748
See application file for complete search history.

(56) References Cited

U.S. PATENT DOCUMENTS

| | | | | |
|---|---|---|---|---|
| 9,477,746 | B2 | 10/2016 | Herron et al. | |
| 9,633,103 | B2 | 4/2017 | Subramanya | |
| 10,025,807 | B2 | 7/2018 | Zhang et al. | |
| 10,664,888 | B2 | 5/2020 | More et al. | |
| 10,706,450 | B1 * | 7/2020 | Tavernier | G06Q 30/0641 |
| 11,893,049 | B2 | 2/2024 | Manoharan et al. | |
| 12,086,851 | B1 * | 9/2024 | Arici | G06Q 30/0631 |
| 12,493,803 | B1 * | 12/2025 | Pathak | G06F 40/289 |
| 12,499,474 | B2 * | 12/2025 | Seo | G06Q 30/0282 |
| 2003/0187837 | A1 | 10/2003 | Culliss | |
| 2006/0020607 | A1 * | 1/2006 | Patterson | G06F 16/313 707/E17.084 |
| 2006/0200464 | A1 | 9/2006 | Gideoni et al. | |
| 2006/0224587 | A1 * | 10/2006 | Zamir | G06F 16/24534 |
| 2008/0033915 | A1 * | 2/2008 | Chen | G06F 16/951 |
| 2008/0033971 | A1 | 2/2008 | Carmel et al. | |
| 2008/0120292 | A1 * | 5/2008 | Sundaresan | G06F 16/355 707/999.005 |
| 2011/0213655 | A1 * | 9/2011 | Henkin | G06Q 30/00 707/E17.061 |
| 2012/0166450 | A1 | 6/2012 | Choi et al. | |
| 2013/0268517 | A1 * | 10/2013 | Madhavan | G06F 16/9535 707/722 |
| 2014/0181136 | A1 | 6/2014 | Johnson | |
| 2014/0229810 | A1 * | 8/2014 | Ramanathan | G06F 40/169 715/202 |
| 2014/0282136 | A1 * | 9/2014 | Marantz | G06F 16/1767 715/764 |
| 2015/0356086 | A1 | 12/2015 | Kamotsky | |
| 2016/0217521 | A1 * | 7/2016 | Hasan | G06F 16/3325 |
| 2017/0193072 | A1 | 7/2017 | Vase et al. | |
| 2017/0242913 | A1 * | 8/2017 | Tijssen | G06F 40/279 |
| 2018/0032930 | A1 * | 2/2018 | Kolb | G06F 40/253 |
| 2018/0068371 | A1 * | 3/2018 | Krishnamurthy | G06N 3/0499 |
| 2018/0204113 | A1 * | 7/2018 | Galron | G06F 18/214 |
| 2018/0300407 | A1 * | 10/2018 | Wolny | G06N 5/04 |
| 2019/0392082 | A1 | 12/2019 | Bell et al. | |
| 2021/0004416 | A1 * | 1/2021 | Xiong | G06F 40/289 |
| 2021/0182935 | A1 * | 6/2021 | Malkiel | G06F 16/3347 |
| 2022/0043871 | A1 | 2/2022 | Prasad et al. | |
| 2022/0075827 | A1 | 3/2022 | Zhou et al. | |
| 2022/0261603 | A1 * | 8/2022 | Ardulov | G06Q 50/01 |
| 2022/0358296 | A1 * | 11/2022 | Mehta | G06V 30/412 |
| 2023/0351102 | A1 * | 11/2023 | Tran | G06N 3/0895 |
| 2024/0071047 | A1 * | 2/2024 | Kundu | G06V 30/42 |
| 2024/0160651 | A1 * | 5/2024 | Bhattacharjee | G06F 16/345 |
| 2024/0281480 | A1 * | 8/2024 | Bellam | G06F 16/9535 |
| 2025/0181888 | A1 * | 6/2025 | Zhu | G06N 3/04 |
| 2025/0322016 | A1 * | 10/2025 | Dey | G06N 20/00 |
| 2025/0322166 | A1 | 10/2025 | Dey et al. | |
| 2026/0187104 | A1 | 7/2026 | Dey et al. | |

OTHER PUBLICATIONS

Agrawal, et al., "Multi-Label Learning with Millions of Labels: Recommending Advertiser Bid Phrases for Web Pages", Proceedings of the 22nd International Conference on World Wide Web (WWW'13), pp. 13-24, 2013, [retrieved from the internet on Mar. 18, 2025], 2013, 11 pages.

Anastasakos, et al., "A Collaborative Filtering Approach to Sponsored Search", Retrieved at <<http://research.yahoo.com/files/YL-2009-006-query-ad-click-graph.pdf>>, Yahoo! Labs Technical Report No. YL-2009-006, Aug. 14, 2009, 24 pages.

Antonellis, et al., "Simrank++: Query rewriting through link analysis of the click graph", Cornell University, arXiv.org, [retrieved from the internet on Mar. 18, 2025], <https://arxiv.org/pdf/0712.0499>, Dec. 14, 2007, 25 pages.

Baeza-Yates, et al., "Extracting Semantic Relations from Query Logs", In Proceedings of the 13th ACM SIGKDD International Conference on Knowledge Discovery and Data Mining (KDD '07), p. 76-85, 2007. [retrieved from the internet on Mar. 18, 2025], 2007, 10 pages.

Bartz, et al., "Logistic Regression and Collaborative Filtering for Sponsored Search Term Recommendation", In Second Workshop on Sponsored Search Auctions, 2006., [retrieved from the internet on Mar. 18, 2025], 2006, 5 pages.

Beeferman, et al., "Agglomerative clustering of a search engine query log", In Proceedings of the Sixth ACM SIGKDD International Conference on Knowledge Discovery and Data Mining (KDD '00), p. 407-416, 2000, [retrieved from the internet on Mar. 18, 2025], <https://www.dougb.com/papers/kdd.pdf>, 2000, 10 pages.

Bhatia, et al., "The Extreme Classification Repository: Multi-label Datasets & Code", [retrieved from the internet on Mar. 18, 2025], <http://manikvarma.org/downloads/XC/XMLRepository.html>, 2016, 17 pages.

Bojanowski, et al., "Enriching Word Vectors with Subword Information", Transactions of the Association for Computational Linguistics vol. 5 [retrieved Oct. 11, 2022]. Retrieved from the Internet <https://research.fb.com/wp-content/uploads/2017/06/tacl.pdf>., Jun. 1, 2017, 12 Pages.

Boudin, F., "Benchmark datasets for keyphrase extraction", GitHub, [retrieved from the internet on Mar. 18, 2025], <https://github.com/boudinfl/ake-datasets/>, 2025, 4 pages.

Brown, et al., "Language Models are Few-Shot Learners", Cornell University, arXiv.org, [retrieved from the internet on Nov. 24, 2024], <https://arxiv.org/abs/2005.14165>, Jul. 22, 2020, 75 pages.

Dahiya, et al., "Deep Encoders with Auxiliary Parameters for Extreme Classification", In Proceedings of the 29th ACM SIGKDD Conference on Knowledge Discovery and Data Mining (KDD '23), p. 358-367, 2023, [retrieved from the internet on Mar. 18, 2025], <http://manikvarma.org/pubs/dahiya23b.pdf>, 2023, 10 pages.

Dahiya, et al., "DeepXML: A Deep Extreme Multi-Label Learning Framework Applied to Short Text Documents", Cornell University, arXiv.org, [retrieved from the internet on Mar. 18, 2025], <https://arxiv.org/pdf/2111.06685>, Nov. 12, 2021, 17 pages.

Dahiya, et al., "NGAME: Negative Mining-aware Mini-batching for Extreme Classification", In Proceedings of the Sixteenth ACM International Conference onWeb Search and Data Mining (WSDM '23), p. 258-266, 2023, [retrieved from the internet on Mar. 18, 2025], <http://manikvarma.org/pubs/dahiya23.pdf>, 2023, 9 pages.

Devlin, et al., "BERT: Pre-Training of Deep Bidirectional Transformers for Language Understanding", Cornell University, arXiv Preprint, arXiv.org [retrieved on Jun. 14, 2023]. Retrieved from the Internet <https://arxiv.org/pdf/1810.04805.pdf>., May 24, 2019, 16 pages.

Gallina, et al., "KPTimes: A Large-Scale Dataset for Keyphrase Generation on News Documents", Cornell University, arXiv.org, [retrieved from the internet on Mar. 18, 2025], <https://arxiv.org/pdf/1911.12559>, Nov. 28, 2019, 6 pages.

Jain, et al., "Renee: End-To-End Training of Extreme Classification Models", Proceedings of Machine Learning and Systems (MLSys '23'), 2023, [retrieved from the internet on Mar. 18, 2025], <http://manikvarma.org/pubs/jain23.pdf>, 2023, 20 pages.

Jain, et al., "Slice: Scalable Linear Extreme Classifiers trained on 100 Million Labels for Related Searches", In Proceedings of the Twelfth ACM International Conference on Web Search and Data Mining (WSDM '19), p. 528- 536, 2019, [retrieved from the internet on Mar. 18, 2025], <http://manikvarma.org/pubs/jain19.pdf>, 2019, 9 pages.

Jansen, et al., "Sponsored search: an overview of the concept, history, and technology", Int. J. Electronic Business, vol. 6, No. 2, 2008, [retrieved from the internet on Mar. 18, 2025], <https://faculty.ist.psu.edu/jjansen/academic/pubs/jansen_overview_sponosored_search.pdf>, 2008, 18 pages.

Joulin, et al., "Bag of Tricks for Efficient Text Classification", Proceedings of the 15th Conference of the European Chapter of the Association for Computational Linguistics vol. 2 [retrieved Aug. 16,

(56) References Cited

OTHER PUBLICATIONS

2021]. Retrieved from the Internet <https://aclanthology.org/E17-2068.pdf>., Aug. 9, 2016, 5 pages.

Joulin, et al., "Fasttext.Zip: Compressing Text Classification Models", Cornell University, arXiv.org, [retrieved from the internet on Mar. 18, 2025], <https://arxiv.org/pdf/1612.03651>, Dec. 12, 2016, 13 pages.

Kaddour, et al., "Challenges and Applications of Large Language Models", Cornell University, arXiv.org, [retrieved from the internet on Mar. 18, 2025], <https://arxiv.org/pdf/2307.10169>, Jul. 19, 20223, 72 pages.

Kumar, Shivam, "How to do Amazon PPC keyword research in 2024", [retrieved from the internet on Oct. 9, 2024], <https://adbrew.io/blog/amazon-ppc-keyword-research/>, Dec. 15, 2023, 8 pages.

Meng, et al., "Deep Keyphrase Generation", Cornell University, arXiv.org, [retrieved from the internet on Mar. 18, 2025], <https://arxiv.org/pdf/1704.06879>, May 31, 2021, 11 pages.

Mishra, et al., "Graphite: A Graph-based Extreme Multi-Label Short Text Classifier for Keyphrase Recommendation", Cornell University, arXiv.org, [retrieved from the internet on Mar. 18, 2025], <https://arxiv.org/pdf/2407.20462>, Jul. 29, 2024, 9 pages.

Selcuk, et al., "Optimal keyword bidding in search-based advertising with target exposure levels", European Journal of Operational Research, vol. 226, Issue 1, Apr. 2013, pp. 163-172.

Yih, et al., "Finding Advertising Keywords on Web Pages", In Proceedings of the 15th International Conference on World Wide Web (WWW'06), pp. 213-222, 2006, [retrieved from the internet on Mar. 18, 2025], <https://www.cs.cmu.edu/~vitor/papers/www06.pdf>, 2006, 10 pages.

You, et al., "AttentionXML: Label Tree-based Attention-Aware Deep Model for High-Performance Extreme Multi-Label Text Classification", Cornell University, arXiv.org, [retrieved from the internet on Mar. 18, 2025], <https://arxiv.org/pdf/1811.01727>, Nov. 4, 2019, 17 pages.

Non-Final Office Action issued in U.S. Appl. No. 19/003,304, mailed Dec. 12, 2025, 21 pages.

Final Office Action issued in U.S. Appl. No. 19/003,304, mailed Feb. 25, 2026, 19 pages.

* cited by examiner

GRAPH-DIRECTED KEY PHRASE RECOMMENDATION BASED ON ITEM SIMILARITY

RELATED APPLICATIONS

This application claims priority to U.S. Application No. 63/633,430 titled Extreme Multi-label Classification, filed Apr. 12, 2024, which is hereby incorporated by reference in its entirety.

BACKGROUND

Key phrase recommendation is a technique used in various domains, including e-commerce, search engines, and content creation. Generally, key phrase recommendation techniques identify and suggest words or phrases that enhance user experience, visibility, and engagement of content items. For example, recommended key phrases for a content item, when searched, are effective to surface the content item or similar content items within a search results page.

SUMMARY

Graph-directed key phrase recommendation based on item similarity is described. In one or more implementations, a dataset is received by a key phrase recommendation system, and the dataset includes items listed via a listing platform, titles of the items, and key phrases. Each of the key phrases is paired with one or more of the key phrases. The key phrase recommendation system constructs a tripartite graph based on the dataset. In the tripartite graph, title tokens of the item titles are mapped to the items associated with the item titles, and the items are mapped to the key phrases that are paired with the items in the dataset.

After the graph is constructed, the key phrase recommendation system receives a seed title of a seed item listed via the listing platform, and the seed title includes one or more seed tokens. Using the tripartite graph, the key phrase recommendation system identifies one or more similar items to the seed item based on occurrence counts of the one or more seed tokens that map to the one or more similar items in the data structure. Candidate key phrases that map to the one or more similar items are identified and ranked.

In particular, the candidate key phrases are ranked based on the occurrence counts, percentages of phrase tokens in the respective candidate key phrases that match the one or more seed tokens, and quantities of the one or more similar items to which the respective candidate key phrases are mapped in the data structure. The key phrase recommendation system generates, as recommended key phrases, a top-ranked subset of the candidate key phrases. The recommended key phrases are communicated for display in ranked order in a user interface of the listing platform.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
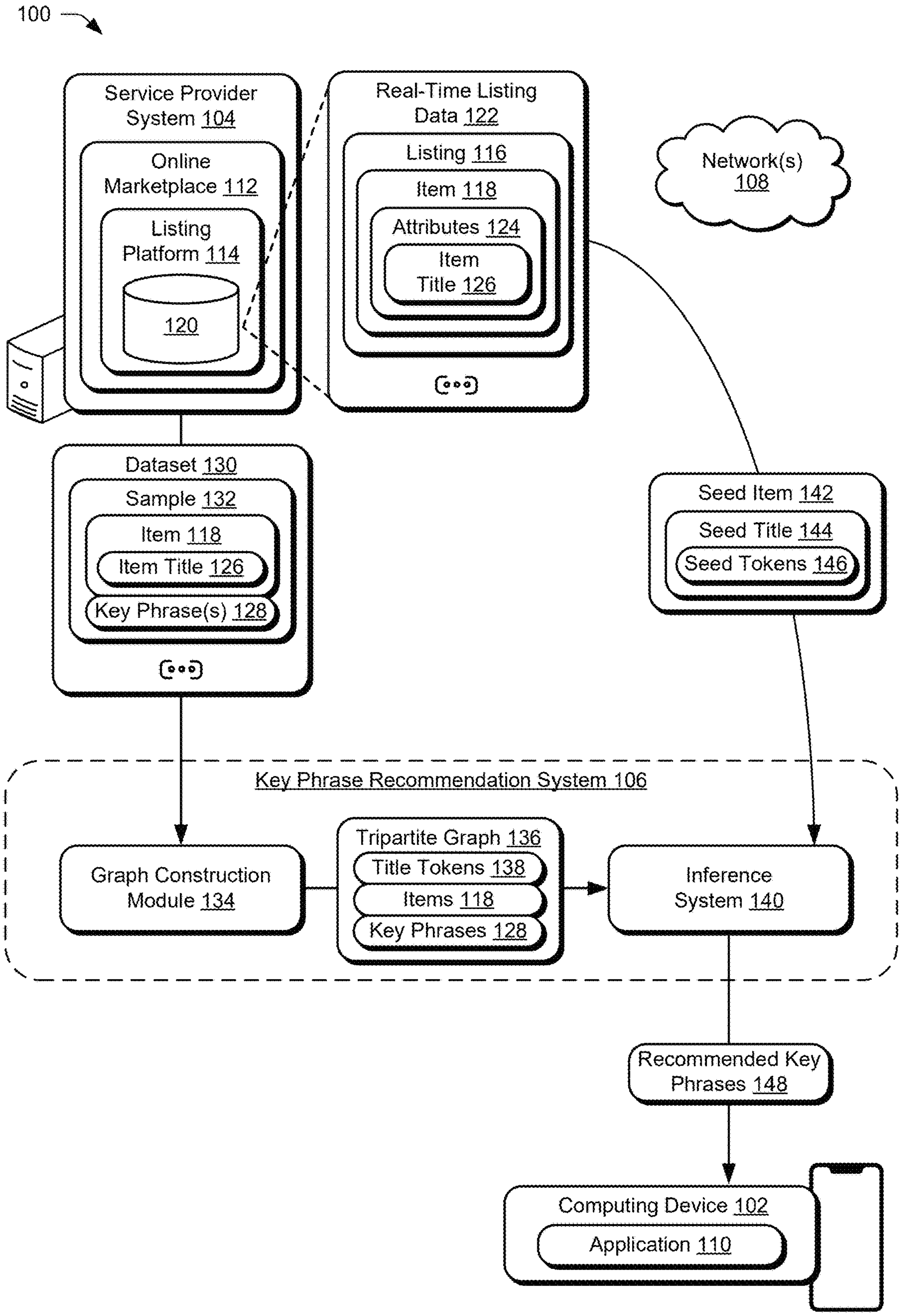
FIG. 1 is an illustration of an environment in an example implementation that is operable to employ techniques described herein.

Listing platforms of online marketplaces are often implemented for key phrase recommendation to recommend key phrases for items listed via the listing platform. Conventional techniques for key phrase recommendations, however, typically use neural networks trained using supervised training techniques for the purpose of recommending key phrases. These neural models are often large in terms of memory occupation, slow in terms of training speed, and/or slow in terms of inference latency. This is due to the large number of hyperparameters and model weights that are updated and subsequently stored during training of these neural models, and the complex operations (e.g., matrix multiplications, activation functions, and the like) that are carried out by these models at inference time. These problems are further exacerbated by the notion that online marketplaces can include large amounts of data (e.g., millions of listings) to be processed during training. Indeed, conventional neural models lack scalability to train on large datasets, often exceeding memory limitations (e.g., and thereby failing during a training stage) when training on datasets that are too large.

To address these limitations, graph-directed key phrase recommendation based on item similarity is described. The described techniques involve a listing platform implemented as part of an online marketplace having a database of listings for items having item titles. In accordance with the described techniques, the key phrase recommendation system obtains a dataset including a plurality of samples. Each sample includes an item having an item title, and one or more key phrases paired with the item. A key phrase is paired with an item in the dataset if historical engagement with the item (in response to the key phrase being searched on the online marketplace) exceeds an engagement threshold. Engagement with the item is definable in various ways, such as the item being clicked, purchased, bid on, added to cart, viewed, and so on.

Based on the dataset, the key phrase recommendation system generates a tripartite graph. The tripartite graph includes a first set of edges mapping title tokens within the item titles to the items associated with the item titles. In addition, the tripartite graph includes a second set of edges mapping the items to the key phrases paired with the items in the dataset. Consider a sample of the dataset including a particular item having a particular item title that is paired with a first key phrase and a second key phrase. In this example, the title tokens of the particular item title are connected via the first set of edges to the particular item in the tripartite graph, and the particular item is connected via the second set of edges to the first key phrase and the second key phrase in the tripartite graph.

After the tripartite graph is constructed, the key phrase recommendation system receives a seed item having a seed title, and the key phrase recommendation system tokenizes the seed title into seed tokens. Further, the key phrase recommendation system identifies, as matching tokens, the title tokens in the tripartite graph that match the seed tokens. Moreover, the key phrase recommendation system traverses the tripartite graph to determine occurrence counts for the items in the tripartite graph. Notably, an occurrence count of an item is the number of matching tokens that are connected to the item in the tripartite graph. Moreover, the key phrase recommendation system determines occurrence counts of the key phrases by associating, with a key phrase, the occurrence count of an item to which the key phrase is connected in the tripartite graph. If a key phrase is connected to multiple key phrases with positive (e.g., non-zero) occurrence counts, the key phrase is associated with a highest occurrence count from among the multiple items.

Once the occurrence counts are assigned to the key phrases, the key phrase recommendation system generates clusters of the key phrases. Each cluster includes the key phrases associated with a same occurrence count. The key phrase recommendation system further filters the clusters by retaining the clusters associated with the occurrence counts that meet an occurrence threshold, while discarding the clusters associated with the occurrence count that do not meet the occurrence threshold. The retained clusters include candidate key phrases which are passed along for ranking by a ranking algorithm of the key phrase recommendation system. In other words, the candidate key phrases of the retained clusters are connected in the tripartite graph to similar items, and the similar items are connected to at least a threshold number (e.g., the occurrence threshold) of the seed tokens in the tripartite graph.

The ranking algorithm ranks the candidate key phrases based on the occurrence counts of the key phrases, word match ratios of the candidate key phrases, and multiplicity values of the key phrases. The word match ratio of a candidate key phrase is the percentage of the total tokens in the candidate key phrase that match the seed tokens in the seed title. Further, the multiplicity value of a candidate key phrase is the number of relevant items to which the candidate key phrase is connected in the tripartite graph, such that the relevant items are those items that are connected to at least one matching token in the tripartite graph. In particular, the candidate key phrases are ranked in descending order of the occurrence counts. If multiple candidate key phrases have a same occurrence count, the multiple candidate key phrases are ranked in descending order of the word match ratios. If multiple candidate key phrases have a same occurrence count and a same word match ratio, the multiple candidate key phrases are ranked in descending order of the multiplicity values.

Once ranked, the key phrase recommendation system identifies, as recommended key phrases, a top-ranked subset of the candidate key phrases, e.g., the ten highest ranked candidate key phrases. Further, the key phrase recommendation system communicates the recommended key phrases to a computing device for display in a user interface (e.g., of the online marketplace) in ranked order.

Accordingly, the described techniques adopt a graph-based approach for key phrase recommendation, rather than a neural model as utilized by conventional techniques. Due to the absence of model weights and hyperparameters that are updated and stored during training, the tripartite graph is constructable in significantly less time than neural models are trained, and the tripartite graph occupies significantly less memory than neural models. The reduced training time enables model refreshes (e.g., regeneration of the tripartite graph to accommodate new key phrases and/or newly listed items) at a rate that is more frequent than conventional techniques. Moreover, the reduced memory footprint of the tripartite graph enables the described techniques to scale to large datasets more efficiently than conventional techniques. This is particularly beneficial in the described online marketplace, which is tasked with storing and processing ever increasing amounts of data, e.g., listings and key phrases. Furthermore, at inference, the described techniques use lightweight graph traversal or lookup operations to identify the relevant key phrases rather than the complex operations (e.g., matrix multiplications, activation functions, and the like) utilized by neural model-based approaches, which reduces computational complexity and inference latency. In summary, the described techniques reduce memory consumption, reduce inference latency, and/or reduce training time (e.g., graph construction time) as compared to conventional approaches.

In the following discussion, an exemplary environment is first described that may employ the techniques described herein. Examples of implementation details and procedures are then described which may be performed in the exemplary environment as well as other environments. Performance of the exemplary procedures is not limited to the exemplary environment and the exemplary environment is not limited to performance of the exemplary procedures.

Example of an Environment

FIG. 1 is an illustration of an environment 100 in an example implementation that is operable to employ techniques described herein. The environment 100 includes a computing device 102, a service provider system 104, and a key phrase recommendation system 106. In one or more implementations, the computing device 102, the service provider system 104, and the key phrase recommendation system 106 are communicatively coupled, one to another, via network(s) 108. One example of the network(s) 108 is the Internet, although one or more of the computing device 102, the service provider system 104, and the key phrase recommendation system 106 may be communicatively coupled using one or more different connections or different networks in various implementations.

Although the key phrase recommendation system 106 is depicted in the environment 100 as being separate from the computing device 102 and the service provider system 104, in one or more implementations, an entirety or various portions of the key phrase recommendation system 106 are implemented at or by the computing device 102 and/or the service provider system 104. In at least one implementation, for example, at least a portion of the key phrase recommendation system 106 is implemented by an application 110 of the computing device 102 and/or using various resources of the computing device 102, such as hardware resources, an operating system, firmware, and so forth. Alternatively or additionally, at least a portion of the key phrase recommendation system 106 is implemented by resources (e.g., server-based storage, processing, and so on) of the service provider system 104. Alternatively or additionally, at least a portion of the key phrase recommendation system 106 is implemented using a third-party service, such as a web services platform that provides one or more hardware and/or other computing resources to support provision of services by web service providers.

Computing devices that implement the environment 100 are configurable in a variety of ways. A computing device, for instance, is configurable as a desktop computer, a laptop computer, a mobile device (e.g., assuming a handheld configuration such as a tablet or mobile phone), an IoT device, a wearable device (e.g., a smart watch, a ring, or smart glasses), an AR/VR device (e.g., the smart glasses), a server, and so forth. Thus, a computing device ranges from full resource devices with substantial memory and processor resources to low-resource devices with limited memory and/or processing resources. Additionally, although in instances in the following discussion reference is made to a computing device in the singular, a computing device is also representative of a plurality of different devices, such as multiple servers of a server farm or data center utilized to perform operations "over the cloud" as further described in relation to FIG. 7.

In at least one implementation, the application 110 supports communication of data across the network(s) 108, such as between the computing device 102 and the service provider system 104 and/or between the computing device 102 and the key phrase recommendation system 106. By supporting such data communication, the application 110 provides a respective user of the computing device 102 (and users of other computing devices) access to online marketplace 112. For example, the computing device 102 receives data from the service provider system 104. Based on the received data, the application 110 causes various systems of the computing device 102 to output user interfaces of the online marketplace 112, such as by displaying user interfaces via display devices or making accessible voice-based user interfaces.

Through interaction of a user with the computing device 102, the application 110 receives user input via one or more user interfaces of the online marketplace 112. Examples of such input include, but are not limited to, receiving touch input in relation to portions of a displayed user interface, receiving one or more voice commands, receiving typed input (e.g., via a physical or virtual ("soft") keyboard), receiving mouse or stylus input, and so forth. One example of the application 110 is a browser, which is operable to navigate to a website of the online marketplace 112, display pages of the website, and facilitate user interaction with web pages of the online marketplace 112's website. Another example of the application 110 is a web-based computer application of the online marketplace 112, such as a mobile application or a desktop application. The application 110 may be configured in different ways, which enable users to interact with their computing devices and by extension perform actions on the online marketplace 112, without departing from the spirit or scope of the techniques described herein.

In one or more implementations, users register with the service provider system 104 to obtain respective user accounts with the online marketplace 112. Such registration may include, for instance, providing an email address and establishing a username and password combination. Subsequent to registering with the service provider system 104, computing devices (e.g., the computing device 102) facilitate signing into, or otherwise authenticating to, the user account in various ways, such as by receiving a username and matching password, receiving biometric information (e.g., at least one image captured of a face or information captured of another body part such as a thumb or finger) that suitably matches stored biometric information associated with the user account, and so forth. In at least some scenarios, however, the user account via which a user accesses the online marketplace 112 may be a guest account that does not require a user to sign in or otherwise authenticate to an already established account before interacting with the online marketplace 112.

Broadly speaking, the online marketplace 112 includes a listing platform 114 providing functionality for generating listings 116 for items 118 and to exposing those listings 116 (e.g., publishing them) across the network(s) 108 to one or more computing devices, including to the computing device 102. For example, the online marketplace 112 may generate listings 116 for items 118 for sale and expose those listings 116 to computing devices, such that users of the computing devices can interact with the listings 116 via user interfaces to initiate transactions (e.g., purchases, add to wish lists, share, and so on) in relation to the respective item 118 or items 118 of the listings 116. In accordance with the described techniques, the online marketplace 112 is configured to generate listings 116 for one or more types of physical goods or property (e.g., clothing and/or clothing accessories, collectibles, furniture, decorative items, textiles, luxury items, electronics, real property, physical computer-readable storage having one or more video games or other digital content stored thereon, and so on), services (e.g., babysitting, dog walking, house cleaning, home repair, general contracting, and so on), digital items (e.g., digital images, digital music, digital videos) that can be downloaded via the network(s) 108, and blockchain backed assets (e.g., non-fungible tokens (NFTs)), to name just a few.

In the illustrated environment 100, the online marketplace 112 includes storage device 120, which is depicted as maintaining real-time listing data 122. The real-time listing data 122 includes listings 116 of items 118 on the online marketplace 112. The storage device 120 may represent one or more databases and/or other types of storage capable of storing the real-time listing data 122. Examples of the storage device 120 include, but are not limited to, mass storage and virtual storage. In one or more implementations, for example, the storage device 120 may be virtualized across a plurality of data centers and/or cloud-based storage devices. The service provider system 104 may implement the online marketplace 112 by using servers that execute stored instructions to deploy various services of the service provider system 104, such that those services perform numerous computations which are effective to provide the functionality described above and below. It is to be appreciated that the online marketplace 112 may include more, fewer, or different components without departing from the spirit or scope described herein.

In one or more implementations, the online marketplace 112 is accessible by decentralized computing devices that correspond to "clients" of the online marketplace 112, e.g., users that have accounts with the online marketplace 112 and/or that access the online marketplace as a "guest" that is not signed to such an account or tracked as a user with an account.

In at least some scenarios, but for the provision of accounts and system guardrails implemented by aspects of the online marketplace 112 (e.g., user interfaces of the application 110), the online marketplace 112 does not generally control actions of the users to use functionality of the online marketplace 112 to list items 118 thereon. For instance, a number (e.g., most) of the users of the online marketplace 112 may not be employed by or otherwise similarly controlled by a company associated with the online marketplace 112. In this way, the users of the online marketplace 112 may exert more control over the items listed with the online marketplace 112 (e.g., the items that those users decide to list through the online marketplace 112) than the company associated with the online marketplace 112 (or its employees or agents).

Users that cause items 118 to be listed on the online marketplace 112 may be referred to as "sellers," whereas users that purchase or otherwise obtain items listed on the online marketplace 112 via its listings may be referred to as "buyers." Sellers and buyers both interact with user interfaces of the online marketplace 112 (e.g., via the application 110) to perform the desired functionality. In addition, an individual user of the online marketplace 112 can interact via the interfaces to be both a seller and a buyer on the online marketplace 112, such as by interacting with the user interfaces to have caused one or more items 118 to be listed on the online marketplace 112 and by interacting with the user interfaces to purchase one or more items 118 from the listings 116 of the online marketplace 112.

A user that is a seller, for instance, may interact with one or more user interfaces of the online marketplace 112 (e.g., output via the application 110) to provide information about one or more items 118 which the user is causing to be listed on the online marketplace 112. Such user interfaces may include prompts that instruct, or guide, users that are sellers to provide various information about items being listed. Examples of information that such interfaces prompt sellers for and that those users provide include but are not limited an item title, an item description, one or more prices (e.g., to purchase the item 118 now and/or a minimum starting bid for the item 118), brand information, size, year, color(s), shipping information (e.g., cost and/or types available), delivery information, return information, payment information, images, videos, models, authenticity information, item history (e.g., chain of custody), and condition (of the item 118), to name a few. One or more portions of such information may be referred to herein as attributes 124 of the listing 116. For example, an item title 126 of the listing 116 may be an attribute of the listing 116, an item description may be an attribute of the listing 116, one or more images uploaded or selected for the listing 116 may be one or more attributes of the listing 116, color(s) of the item 118 may be an attribute of the listing 116, one or more item categories of the item 118 may be an attribute of the listing 116, and so forth.

In one or more implementations, the online marketplace 112 saves and maintains the input information for a listing 116 in the storage device 120 in fields of a data structure or data record populated for the listing 116, where a given field and the information populated and maintained for the given field correspond to a particular attribute 124 of the listing 116. For instance, an 'item title' field of such a data structure or data record may be populated with information (e.g., text) input into a user interface by a seller of a listing 116. The title field and the information input by the user as the item title 126 of the listing 116 correspond to an attribute 124 of the listing 116. In one or more implementations, one or more of the attributes 124 of a listing 116 may be derived and then populated by the online marketplace 112, such as by the online marketplace 112 processing one or more portions of the information input by a user to populate one or more respective attributes 124 of the listing 116.

In various implementations, the online marketplace 112 and/or the listing platform 114 are configured to implement a search feature (e.g., a search engine) for enabling a user of the computing device 102 to search for specific listings 116 on the online marketplace 112. For example, the application 110 exposes a user interface of the online marketplace 112 for display by the computing device 102. The user interface, for example, includes user interface elements (e.g., a search bar and selectable search filters) via which the user provides input to specify characteristics of an item 118 that the user desires to view, purchase, bid on, etc. In response to receiving a user query, the search feature surfaces, in the user interface, listings 116 that resemble the user query.

Although not illustrated, the storage device 120 additionally maintains query data (e.g., search logs) in various implementations. The query data includes, for instance, key phrases 128 searched via the search feature of the listing platform 114, and items 118 engaged with when the key phrases 128 are searched. It should be noted that the term key phrase 128 includes singular tokens and words, or phrases of multiple tokens and words. Moreover, the order of tokens in key phrases 128 provides uniqueness to the key phrases 128, e.g., two key phrases 128 having the same combination of tokens in different sequences are two distinct key phrases 128. Furthermore, engagement with an item 118 is definable in any one or more of a variety of ways, such as the item being clicked, purchased, bid on, added to cart, viewed, and so on.

As shown, the key phrase recommendation system 106 receives a dataset 130, including a plurality of samples 132. Each sample 132 includes an item 118 having an item title 126, and one or more key phrases 128 paired with the item 118. A key phrase 128 is paired with an item 118 in the dataset 130 based on historical engagement (e.g., as indicated by the query data) with the item 118 in response to the key phrase 128 being searched via the search feature of the listing platform 114. For example, a key phrase 128 is defined as co-occurring with the item 118 if the item 118 is engaged with in a search results page that is surfaced by searching the key phrase 128 via the search feature of the listing platform 114. Moreover, the key phrase 128 is paired with the item 118 as a sample 132 in the dataset 130 based on a quantity of co-occurrence and/or a pattern of co-occurrence. In one or more implementations, for instance, the key phrase 128 is paired with the item 118 if the search logs include at least a threshold number of co-occurrences between the item 118 and the key phrase 128. Additionally or alternatively, the key phrase 128 is paired with the item 118 if the search logs indicate a pattern of co-occurrences between the item 118 and the key phrase 128, e.g., at least one co-occurrence every day during the previous seven days.

The dataset 130 is received by a graph construction module 134, which is configured to generate a tripartite graph 136 based on the dataset 130. As shown, the tripartite graph 136 includes title tokens 138 occurring within the item titles 126. For example, the item title 126 "NeuraCore X12 Pro" includes title tokens 138 "NeuraCore," "X12," and "Pro." In particular, the tripartite graph 136 maps the title tokens 138 to the items 118 associated with the item titles 126, and the tripartite graph 136 further maps the items 118 to the key phrases 128 paired with the items 118 in the dataset 130. Notably, a tripartite graph 136 is a data structure including vertices divided into three disjoint subsets, in which no two vertices in a same subset are connected by an edge. Instead, all edges in the tripartite graph connect a vertex in one subset to a vertex in another subset.

In this context, the tripartite graph 136 includes the title tokens 138 as a first subset of vertices, the items 118 as a second subset of vertices, and the key phrases 128 as a third subset of vertices. Further, the tripartite graph includes a first set of edges connecting the title tokens 138 to the items 118, and a second set of edges connecting the items 118 to the key phrases 128. Notably, the tripartite graph 136 includes one vertex for each unique title token 138, e.g., even if the title token 138 occurs in multiple item titles 126 in the dataset. Further, the tripartite graph 136 includes one vertex for each unique key phrase 128, e.g., even if the key phrase 128 is paired with multiple different items 118 in the dataset 130.

Consider a sample 132 including a particular item 118 having a particular item title 126, and the particular item 118 is paired with a first key phrase 128 and a second key phrase 128 as a sample 132 of the dataset 130. In this example, the title tokens 138 within the particular item title 126 are connected via an edge of the tripartite graph 136 to the particular item 118, and the particular item 118 is connected via two edges of the tripartite graph 136 to the first key phrase 128 and the second key phrase 128. Once constructed, the tripartite graph 136 is stored, e.g., in the storage device 120.

An inference system 140 is illustrated as receiving a seed item 142 having a seed title 144, and one or more seed tokens 146 within the seed title 144. In one or more implementations, a seed item 142 is an item 118 that is newly listed by a seller via the listing platform 114. Further, the seed title 144 is the item title 126 of the seed item 142. Generally, the inference system 140 is configured to generate recommended key phrases 148 for the seed item 142 by traversing the tripartite graph 136. To do so, the key phrase recommendation system 106 obtains the tripartite graph 136, e.g., from the storage device 120. Further, the inference system 140 identifies, as matching tokens, the title tokens 138 in the tripartite graph 136 that match the seed tokens 146. Moreover, the inference system 140 identifies similar items 118 to the seed item 142 that are mapped to at least a threshold number of the matching tokens in the tripartite graph 136. The recommended key phrases 148 include one or more of the key phrases 128 that are mapped to the similar items in the tripartite graph 136.

In accordance with the described techniques, the recommended key phrases 148 are communicated to the computing device 102 of a seller having listed the seed item 142, and the computing device 102 displays the recommended key phrases 148 in a user interface of the application 110. In this context, the recommended key phrases 148 represent query terms that the seller can bid on in order to promote the seed item 142 (e.g., move the listing 116 for the seed item 142 to a more prominent position in a search results page) when the recommended key phrase 148 is entered via the search feature of the online marketplace 112.

Conventional techniques for key phrase recommendation typically use neural models trained using supervised tagging techniques, which during training, update weights of the neural models and tune hyperparameters based on a loss function. In contrast, the described techniques rely on a graph-based approach, in which the construction of the tripartite graph 136 (e.g., the training phase) does not involve such weight updates and hyperparameter tuning. Thus, the tripartite graph 136 is constructable in significantly less time than conventional neural models are trained. Due to the reduced training time, the described techniques enable frequent model refreshes, e.g., so the key phrase recommendation system 106 can frequently update the tripartite graph 136 to include new items 118 listed and new key phrases 128 searched via the online marketplace 112.

In addition, at inference time, the described techniques use lightweight graph traversal or lookup operations to identify the recommended key phrases 148 rather than complex operations (e.g., matrix multiplications, activation functions, and the like) utilized by neural model-based approaches, which reduces computational complexity. As a result, the inference latency (e.g., the time between submission of a request for key phrase recommendations by a seller, and when the recommended key phrases 148 are returned to the computing device 102 for display) of the described techniques is significantly reduced, as compared to conventional techniques.

Furthermore, the size of the tripartite graph 136 (e.g., in terms of memory) is significantly smaller than neural model-based approaches since the model weights and hyperparameters need not be stored. Due to the increased size, conventional neural models lack scalability to train on large datasets, often exceeding memory limitations (e.g., and thereby failing during a training stage) when training on datasets that are too large. Given this, the described techniques reduce memory consumption as compared to conventional techniques, and as a result, the described techniques are able to scale to larger datasets 130 more efficiently than conventional techniques.

One problem with engagement-based labeling and/or tagging techniques is popularity bias. Indeed, an item 118 is paired with a key phrase 128 as a sample of training data if the item 118 receives sufficient engagement when the key phrase is searched, as previously discussed. While unpopular items make up a majority of the online marketplace 112, unpopular items typically receive sufficient engagement to be paired with just one key phrase 128 in the training data. By using supervised learning on item and key phrase pairings, conventional techniques inherit this popularity bias, and thus, often recommend just one key phrase 128 for unpopular items.

In contrast, the described techniques use a similar item-based recommendation approach in which similar items 118 to the seed item 142 are identified based on token correspondence, and key phrases 128 that lead to engagement of the similar items 118 are recommended to a user. This eliminates the popularity bias because, although the similar items 118 may individually be connected to one or just a few key phrases 128 in the tripartite graph 136, the seed item 142 is typically similar to (e.g., has token correspondence with) many items 118. Moreover, by pairing key phrases 128 with items 118 in the dataset 130 based on engagement, the described techniques maintain bias towards recommending key phrases 128 that produce engagement when searched, which are the types of key phrases 128 that users prefer. In other words, the described techniques improve the quality of the recommended key phrases 148 over conventional techniques by increasing a number of recommended key phrases 148 for unpopular items while recommending key phrases that have historically led to engagement when searched on the online marketplace 112.

Having considered an example of an environment, consider now a discussion of some example details of the techniques for graph-directed key phrase recommendation based on item similarity in accordance with one or more implementations.

Key Phrase Recommendation Details

Figure 2:
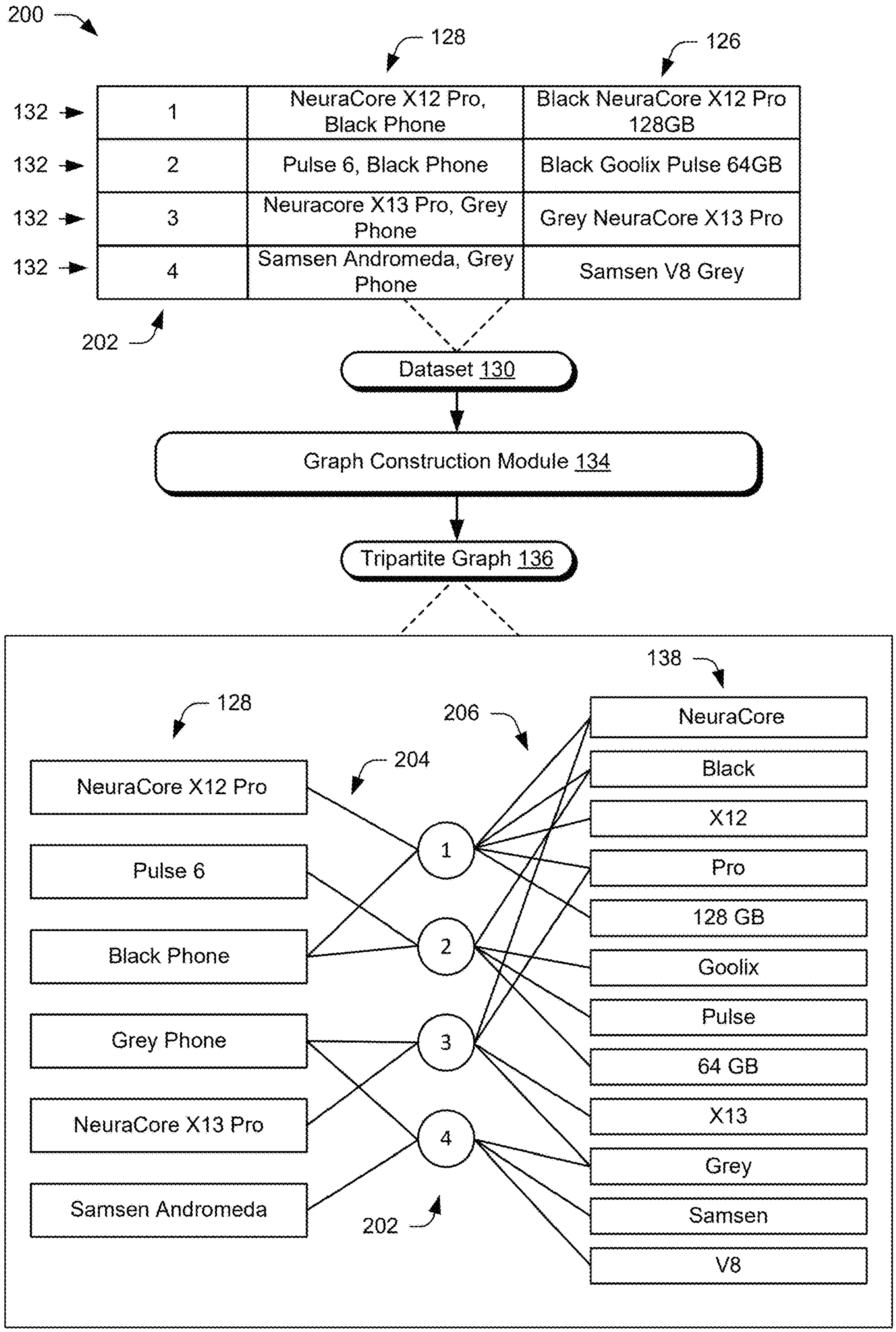
FIG. 2 depicts an example of constructing a tripartite graph in accordance with the described techniques.

FIG. 2 depicts an example 200 of constructing a tripartite graph in accordance with the described techniques. In the example 200, the graph construction module 134 receives the dataset 130. As shown, the dataset 130 includes multiple samples 132, and each sample 132 includes an item 118 having an item title 126 and an item identifier 202 (e.g., numerical identifier), and the item 118 of the sample 132 is paired with one or more key phrases 128. Consider the item 118 with the item identifier of '1' as an example. In this example, the item title 126 is "Black NeuraCore X12 Pro 128 GB" and the key phrases 128 associated with the item 118 are "NeuraCore X12 Pro" and "Black Phone." In some examples, these key phrases 128 are paired with the item 118 because (1) there is a threshold number of co-occurrences between these key phrases 128 and the item 118 in the search logs, and (2) there is a pattern of co-occurrence between these key phrases 128 and the item 118 in the search logs, e.g., the key phrases 128 co-occur with the item 118 at least once per day over the previous seven days.

The graph construction module 134 generates a tripartite graph 136 based on the dataset 130. As shown, the tripartite graph 136 includes the key phrases 128 as a first disjoint subset of vertices, the item identifiers 202 as a second disjoint subset of vertices, and the title tokens 138 within the item titles 126 as a third disjoint subset of vertices. For example, the item title 126 "Black NeuraCore X12 Pro 128 GB" is tokenized into title tokens 138 "Black," "NeuraCore," "X12," "Pro," and "128 GB," which are represented as separate vertices in the third disjoint subset. Notably, the graph construction module 134 deduplicates the key phrases 128 and title tokens 138 in the tripartite graph 136. For instance, although the key phrase 128 "Black Phone" is represented in two different samples 132, it is only represented once in the tripartite graph 136. Similarly, although the title token 138 "NeuraCore" is represented in two different samples 132, it is only represented once in the tripartite graph 136.

As shown, the tripartite graph 136 includes edges 204 connecting the key phrases 128 to the item identifiers 202 with which the key phrases 128 are paired in the dataset 130. For example, the tripartite graph 136 includes edges 204 connecting the item identifier 202 of "1" to the key phrases 128 "NeuraCore X12 Pro" and "Black Phone" because these key phrases 128 are paired with the item identifier 202 of "1" as a sample 132 in the dataset 130. In addition, the tripartite graph 136 includes edges 206 connecting the title tokens 138 to the item identifiers 202 associated with corresponding item titles 126 in the dataset 130. For example, the title token 138 of "NeuraCore" is derived from the item titles 126 paired with the item identifiers 202 of "1" and "3" in the dataset 130, and as such, the title token 138 of "NeuraCore" is connected to the item identifiers 202 of "1" and "3" via the edges 206.

In the illustrated example 200, the edges 204 connect the key phrases 128 to the item identifiers 202, and the edges 206 connect the item identifiers 202 to the title tokens 138. However, there are no edges connecting the title tokens 138 to the key phrases 128. In this sense, the tripartite graph 136 is conceptualizable as two bipartite graphs. Notably, a bipartite graph is a data structure including vertices divided into two disjoint subsets, in which no two vertices in a same subset are connected by an edge. Instead, all edges in the bipartite graph connect a vertex in one subset to a vertex in another subset. In this context, the tripartite graph 136 includes a first bipartite graph including the key phrases 128 as a first disjoint subset of vertices, the item identifiers as a second disjoint subset of vertices, and edges 204 connecting key phrases 128 to the item identifiers 202. In addition, the tripartite graph 136 includes a second bipartite graph including the item identifiers 202 as a first disjoint subset of vertices, the title tokens 138 as a second disjoint subset of vertices, and edges 206 connecting key phrases 128 to the item identifiers 202.

Notably, the items 118 are represented as non-negative integers. Moreover, although depicted as text for illustrative purposes, the key phrases 128 and the title tokens 138 are also represented as non-negative integers. This reduces storage costs and avoids string comparisons. Moreover, the tripartite graph 136 is stored in the storage device 120 in compressed sparse row (CSR) format. In accordance with the described techniques, each row of the CSR format represents an item identifier 202, includes numerical identifiers of the key phrases 128 to which the item identifier 202 is connected via the edges 204, and includes numerical identifiers of the title tokens 138 to which the item identifier 202 is connected via the edges 206. Notably, storage in the CSR format reduces storage costs as compared to other storage formats.

Figure 3:
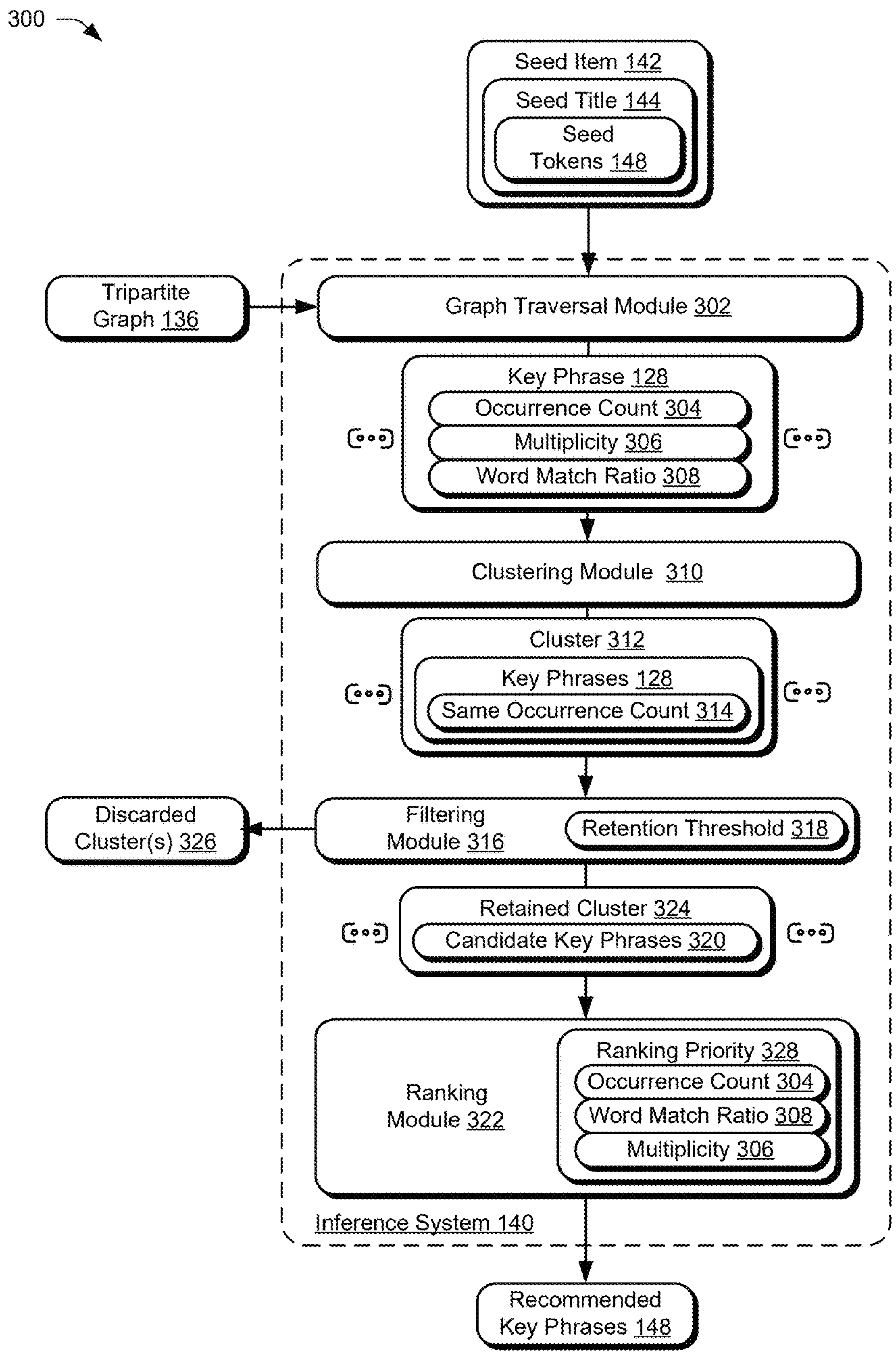
FIG. 3 depicts an example of an inference system generating recommended key phrases for a seed item.

FIG. 3 depicts an example 300 of an inference system generating recommended key phrases for a seed item. In the example 300, the inference system 140 receives a seed item 142 having a seed title 144 and seed tokens 146. For example, the inference system 140 receives the seed item 142 in response to a new listing 116 being created on the online marketplace 112 for the seed item 142, and the seed item 142 is listed with a seed title 144. In particular, the seed item 142 is provided as input to a graph traversal module 302. Generally, the graph traversal module 302 accesses the tripartite graph 136 from the storage device 120 and assigns attributes (e.g., occurrence count 304, multiplicity 306, and word match ratio 308) to the key phrases 128 by traversing the tripartite graph 136.

To do so, the graph traversal module 302 identifies, as matching tokens, the title tokens 138 in the tripartite graph 136 that match the seed tokens 146 in the seed title 144. Further, the graph traversal module 302 identifies the items 118 (e.g., the item identifiers 202) to which the matching tokens are connected via the edges 206 of the tripartite graph 136. In addition, the graph traversal module 302 associates occurrence counts 304 with those identified items 118. The occurrence count 304 of an item 118 is the number of matching tokens connected to the item 118 (e.g., the item identifier 202) via the edges 206. To determine an occurrence count 304 of a key phrase 128, the graph traversal module 302 associates, with the key phrase 128, the occurrence count 304 of an item 118 to which the key phrase 128 is connected via the edges 206. In cases in which a key phrase 128 is mapped to multiple items 118 that are mapped to at least one matching token, the key phrase 128 is associated with a highest occurrence count 304 of the multiple items 118. In an example in which a key phrase 128 is mapped to a first item 118 with an occurrence count 304 of three and a second item 118 with an occurrence count 304 of two, the key phrase 128 is associated with an occurrence count 304 of three. Notably, the occurrence counts 304 are stored in count arrays in variations, thereby avoiding more complex (and slower) sorting algorithms at the traversal stage.

The multiplicity 306 of a key phrase 128 is a count of items 118 (e.g., item identifiers 202) connected to the key phrase 128 that are connected to at least one matching token. Consider an example in which a key phrase 128 is connected to four item identifiers 202 via the edges 204 in the tripartite graph 136, but only two of the item identifiers 202 map to matching tokens (e.g., seed tokens 146) via the edges 206 in the tripartite graph 136. In this example, the multiplicity 306 of the key phrase 128 is two.

The word match ratio of a key phrase 128 is the ratio or percentage of phrase tokens in the key phrase 128 that match the seed tokens 146. Indeed, the word match ratio is definable as:

$$WMR(i, k) = \frac{|i \cap k|}{|k|}$$

In the equation above, WMR (i, k) represents the word match ratio between an item 118, i, and a key phrase 128, k, $|i \cap k|$ represents the intersection of the phrase tokens in the key phrase 128 and the seed tokens 146 in the seed title 144, and $|k|$ represents the number of phrase tokens in the key phrase 128. The process is repeated by the graph traversal module 302 to determine the attributes (e.g., occurrence count 304, multiplicity 306, and word match ratio 308) for each key phrase 128 connected via an item 118 to at least one matching token.

The inference system 140 leverages a clustering module 310 to generate a plurality of clusters 312 of the key phrases 128 clustered on the basis of the occurrence counts 304. Each cluster 312 generated by the clustering module 310, for instance, includes the key phrases 128 associated with a same occurrence count 314. In an example in which the seed title 144 includes three seed tokens 146, the clusters 312 may include a first cluster 312 of the key phrases 128 associated with an occurrence count 304 of one, a second cluster 312 of the key phrases 128 associated with an occurrence count 304 of two, and/or a third cluster 312 of the key phrases 128 associated with an occurrence count 304 of three.

As shown, the clusters 312 are provided as input to a filtering module 316 which is configured to filter the clusters 312 based on the occurrence counts 304. As part of this, the filtering module 316 is programmed with a retention threshold 318, which defines a minimum number of candidate key phrases 320 (e.g., of the key phrases 128) to be analyzed by a ranking module 322. Furthermore, the filtering module 316 filters the clusters 312 by retaining the clusters 312 associated with an occurrence count 304 that meets an occurrence threshold (e.g., the retained clusters 324), while discarding the clusters 312 associated with an occurrence count 304 that does not meet the occurrence threshold. The filtering module 316 sets the occurrence threshold at a value such that the number of the candidate key phrases 320 across all retained clusters exceeds the retention threshold 318. In this context, the candidate key phrases 320 are conceptualizable as mapped to similar items 118 to the seed item 142 in the tripartite graph 136. Further, the similar items 118 are defined as similar to the seed item 142 because the similar items 118 are associated with the occurrence counts 304 (e.g., mapped to a number of the seed tokens 146 in the tripartite graph 136) that meets the occurrence threshold.

Consider an example in which the retention threshold 318 is twenty key phrases 128, and there are three clusters 312-*a* first cluster 312 of ten key phrases 128 associated with an occurrence count 304 of one, a second cluster 312 of ten key phrases 128 associated with an occurrence count 304 of two, and a third cluster 312 of fifteen phrases 128 associated with an occurrence count 304 of three. Here, the filtering module 316 retains, as the retained clusters 324, the second cluster 312 and the third cluster 312. In addition, the filtering module 316 discards, as the discarded cluster 326, the first cluster 312. In other words, the filtering module 316 retains the third cluster 312 having the highest occurrence count 304, but the third cluster 312, by itself, does not have sufficient key phrases 128 to satisfy the retention threshold 318. So, the filtering module 316 retains the second cluster 312 having the next highest occurrence count 304. Notably, the second cluster 312 is referred to as a threshold cluster because the second cluster pushes the number of retained candidate key phrases 320 above the retention threshold 318. The entire threshold cluster 312 is retained regardless of the degree to which the number of retained candidate key phrases 320 exceeds the retention threshold 318. Furthermore, the filtering module 316 discards the cluster(s) 312 having the occurrence count(s) 304 that are less than the occurrence count 304 of the threshold cluster 312.

By filtering the clusters 312 in the described manner, the described techniques reduce the number of key phrases 128 for the ranking module 322 to rank and sort. This reduces the amount of computational resources (e.g., processing resources and memory resources) utilized to perform the ranking and the sorting. In addition, the filtering techniques reduce the time it takes for the ranking module 322 to rank and sort the key phrases 128, thereby reducing inference latency for the system. This is particularly beneficial when generating recommended key phrases 148 for seed items 142 that map to many key phrases 128 in the tripartite graph 136. In summary, the described techniques limit the computational complexity of the ranking and sorting operations of the ranking module 322 by limiting the number of key phrases 128 that the ranking module 322 ranks and sorts. It is to be appreciated that the filtering module 316 is optional, and as such, the inference system 140 generates the recommended key phrases 148 without performing the filtering operations in variations.

As shown, the ranking module 322 receives the candidate key phrases 320 of the retained clusters 324. Generally, the ranking module 322 is configured to rank the candidate key phrases 320 in accordance with a ranking priority 328. The ranking priority 328 dictates that the candidate key phrases 320 are ranked in descending order of their occurrence counts 304, candidate key phrases 320 having the same occurrence count 304 are ranked in descending order of their word match ratios 308, and candidate key phrases 320 having the same occurrence count 304 and same word match ratio are ranked in descending order of their multiplicity 306 values.

Consider an example in which a first retained cluster 324 is associated with an occurrence count 304 of three, and a second retained cluster 324 is associated with an occurrence count 304 of two. In this example, all candidate key phrases 320 in the first retained cluster 324 are ranked above all candidate key phrases 320 in the second retained cluster 324. Furthermore, the first retained cluster 324 has three candidate key phrases 320-*a* first candidate key phrase 320 associated with a word match ratio 308 of 0.75 and a multiplicity 306 of two, a second candidate key phrase 320 associated with a word match ratio 308 of 0.5 and a multiplicity of two, and a third candidate key phrase 320 associated with a word match ratio 308 of 0.5 and a multiplicity of one. Here, the first candidate key phrase 320 is ranked above the second and third candidate key phrases 320 because the first candidate key phrase 320 has a higher word match ratio 308. While the second and third candidate key phrases 320 have the same word match ratio 308, the second candidate key phrase 320 has a higher multiplicity 306 value, and is therefore ranked higher in this example.

Thus, the ranking priority 328 is designed to reward (e.g., rank higher) the candidate key phrases 320 with higher occurrence counts 304. In addition, the ranking priority 328 is designed to reward (e.g., rank higher) the candidate key phrases 320 with higher word match ratios 308. Notably, the word match ratio captures a percentage of tokens shared between the seed item 142 and the candidate key phrase 320, thereby rewarding (e.g., ranking higher) the candidate key phrases 320 with a higher proportion of the seed tokens 146 included therein. Moreover, the ranking priority is designed to reward (e.g., rank higher) the candidate key phrases 320 with higher multiplicity 306 values. Notably, multiplicity 306 captures the number of similar items 118 to the seed item 142 (e.g., such that the similar items 118 are defined as those items connected to at least one seed token 146 in the tripartite graph 136), and as such, higher multiplicity 306 values correspond to increased relevancy of the candidate key phrases 320 to the seed item 142.

It is to be appreciated that alternative attributes and/or alternative ranking priorities are implementable by the ranking module 322 in various implementations. In one or more examples, the graph traversal module 302, in addition or as an alternative to, the word match ratio 308, determines an inclusion-exclusion ratio for each key phrase 128. The inclusion-exclusion ratio of a key phrase 128 is a ratio of the number of common tokens shared between the key phrase 128 and the seed title 144 to the number of phrase tokens in the key phrase 128 that are excluded from the seed title 144. Here, the ranking module 322 ranks the candidate key phrases based on the inclusion-exclusion ratio (e.g., preferring higher values thereof) in addition or as an alternative to the word match ratio.

In yet another example, the ranking module 322 the word match ratio 308 is of higher priority than the occurrence count 304. For instance, the ranking module 322 ranks the candidate key phrases 320 in descending order of the word match ratios 308, ranks the candidate key phrases 320 with the same word match ratio 308 in descending order of the occurrence counts 304, and ranks the candidate key phrases 320 with the same word match ratio 308 and same occurrence count 304 in descending order of the multiplicity 306 values. Thus, the ranking module 322 ranks the candidate key phrases in a variety of ways without departing from the spirit or scope of the described techniques.

In one or more implementations, the ranking module 322 outputs, as recommended key phrases 148, a top-ranked subset of the candidate key phrases 320, e.g., the ten highest ranked candidate key phrases 320. In particular, the recommended key phrases 148 are communicated to the computing device 102 for display in ranked order in a user interface of the application 110, e.g., of the online marketplace 112.

In implementations, the inference system 140 is configured to utilize multi-threading techniques, in which the inference system 140 generates recommended key phrases 148 for multiple seed items 142 in parallel by processing the different seed items 142 in parallel on different threads of execution. This is carried out, in part, by running a compiler that leverages single instruction, multiple data (SIMD) vectorization, thereby enabling a single instruction to be processed by multiple threads in parallel. Multi-threading in the described manner further improves inference latency for the system. In addition, unlike many neural-model based approaches, the described inferencing process is executable without utilizing graphics processing unit (GPU) resources.

It is to be appreciated that multiple tripartite graphs 136 are constructable by the key phrase recommendation system 106 in variations. Indeed, the tripartite graphs 136 are aggregated by item category (e.g., electronics, clothing, etc.) in various implementations. That is, the graph construction module 134 generates a tripartite graph 136 for each item category based on a dataset 130 defining the key phrases 128 leading to engagement of items 118 within that item category. At inference, the inference system 140 receives the seed item 142 listed within a particular item category, and the inference system 140 obtains the tripartite graph 136 of the particular item category from the storage device 120. Furthermore, the inference system 140 generates the recommended key phrases 148 using the tripartite graph 136 of the particular item category. In summary, although a single tripartite graph 136 is depicted and described above, it is to be appreciated that the tripartite graph 136 is representative of a plurality of tripartite graph 136 generated for different item categories of the online marketplace 112.

In this context, it should be noted that different item categories have vastly different numbers of listings 116 on the online marketplace 112. Due to the increased amount of listings 116, these large item categories produce tripartite graphs 136 that are larger (e.g., in terms of memory) and slower (e.g., in terms of inference latency). To alleviate the impacts of larger tripartite graphs 136, the graph construction module 134 may reduce the size of the dataset 130 on which the tripartite graph 136 is constructed in various implementations. For example, the graph construction module 134 receives the dataset 130 for an item category. If the amount of data (e.g., the combined number of items 118 and key phrases 128) in the dataset 130 exceeds a threshold, then the graph construction module 134 determines to reduce the size of the dataset 130.

One way to do so is to prune key phrases 128 from the dataset 130 based on search count, e.g., the number of times a key phrase 128 has been searched over a previous time interval. Notably, the search count of a key phrase 128 is ascertainable from the query data and/or search logs. For instance, the graph construction module 134 identifies those key phrases 128 having a search count below a threshold, and removes those key phrases 128. In addition, the graph construction module 134 removes the items 118 that have no key phrases 128 paired therewith after the key phrase removal. Another way to reduce the size of the dataset 130 includes tightening the engagement considerations in order for a key phrase to be paired with an item 118 in the dataset 130, e.g., a larger quantity of co-occurrences or a longer, denser, or more frequent pattern of co-occurrences. This reduces memory consumption, inference latency, and graph construction (e.g., training) time for the tripartite graphs 136 constructed for the larger item categories.

Figure 4:
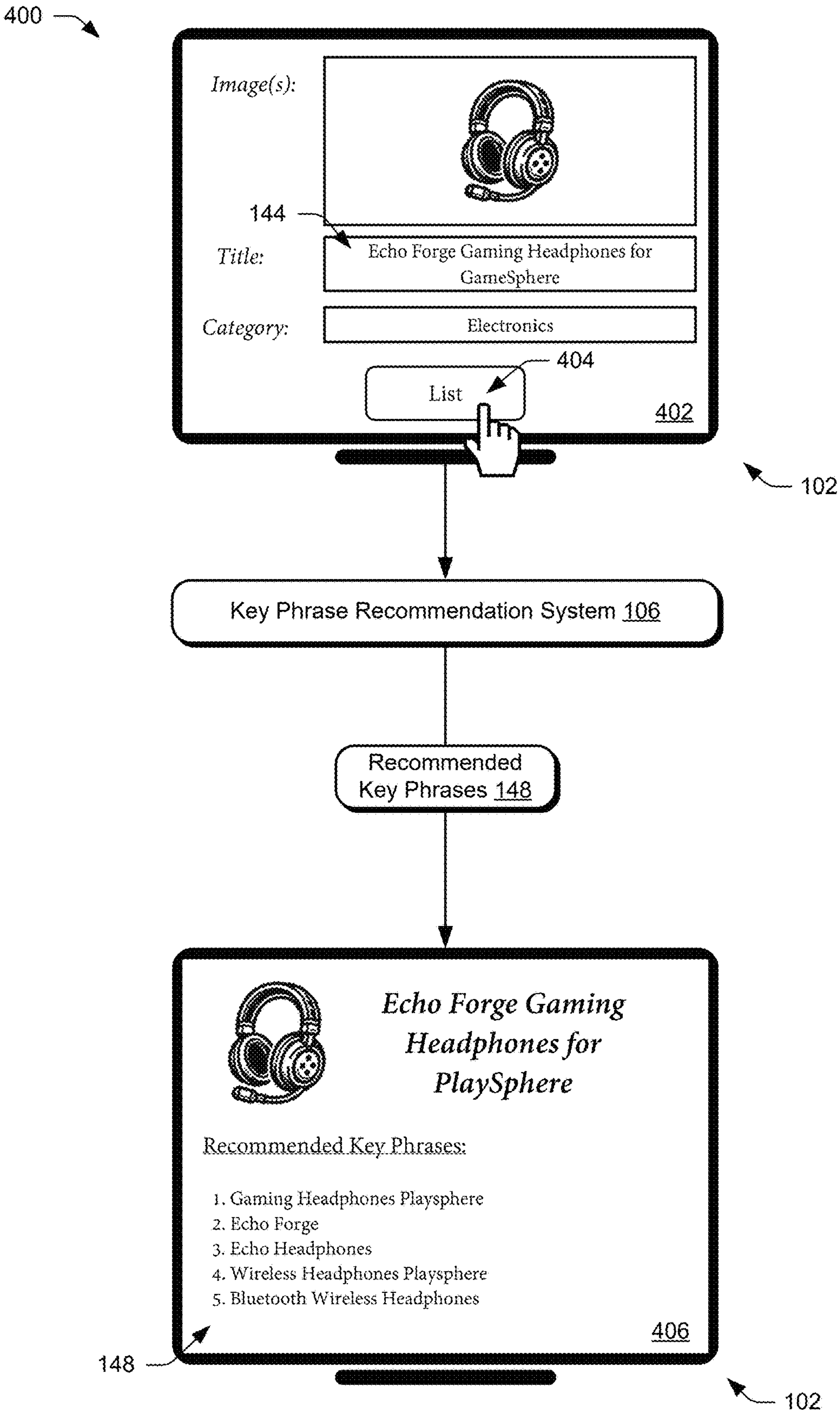
FIG. 4 is an example showing user interfaces displayable in accordance with the described techniques.

FIG. 4 is an example 400 showing user interfaces displayable in accordance with the described techniques. In the example 400, the computing device 102 of a user (e.g., seller) displays a user interface 402 of the application 110 of the online marketplace 112. The user interface 402 include input areas into which the user has input various attributes 124 (e.g., an item image, an item title 126, and an item category) of a listing 116 of a seed item 142 to be listed via the online marketplace 112. As shown at 404, the user provides input selecting a user interface element, and the selection causes a listing 116 for the item to be published via the online marketplace 112. In response to the user selection, the seed item 142 including the seed title 144 is communicated to the key phrase recommendation system 106, which generates the recommended key phrases 148 in accordance with the described techniques. In one or more implementations, this process involves accessing the tripartite graph 136 of the item category from the storage device 120, and generating the recommended key phrases 148 using the tripartite graph 136.

As shown, the recommended key phrases 148 are communicated back to the computing device 102. This causes the computing device to display a user interface 406 of the application 110 that includes the recommended key phrases 148 displayed in ranked order as ranked by the ranking module 322. For example, the ranking module 322 ranks the recommended key phrases 148 in the following order from highest to lowest rank: (1) Gaming Headphones PlaySphere, (2) Echo Forge, (3) Echo HeadPhones, (4) Wireless Headphones Playsphere, (5) Bluetooth Wireless Headphones. As shown, the key phrase recommendation system 106 communicates the recommended key phrases 148 to be displayed in the user interface 406 in this order. In one or more implementations, the user may select individual key phrases of the recommended key phrases 148 to initiate a process for bidding on the recommended key phrase 148, e.g., for the purpose of promoting the seed item 142 when the recommended key phrase 148 is searched on the online marketplace 112.

Figure 5:
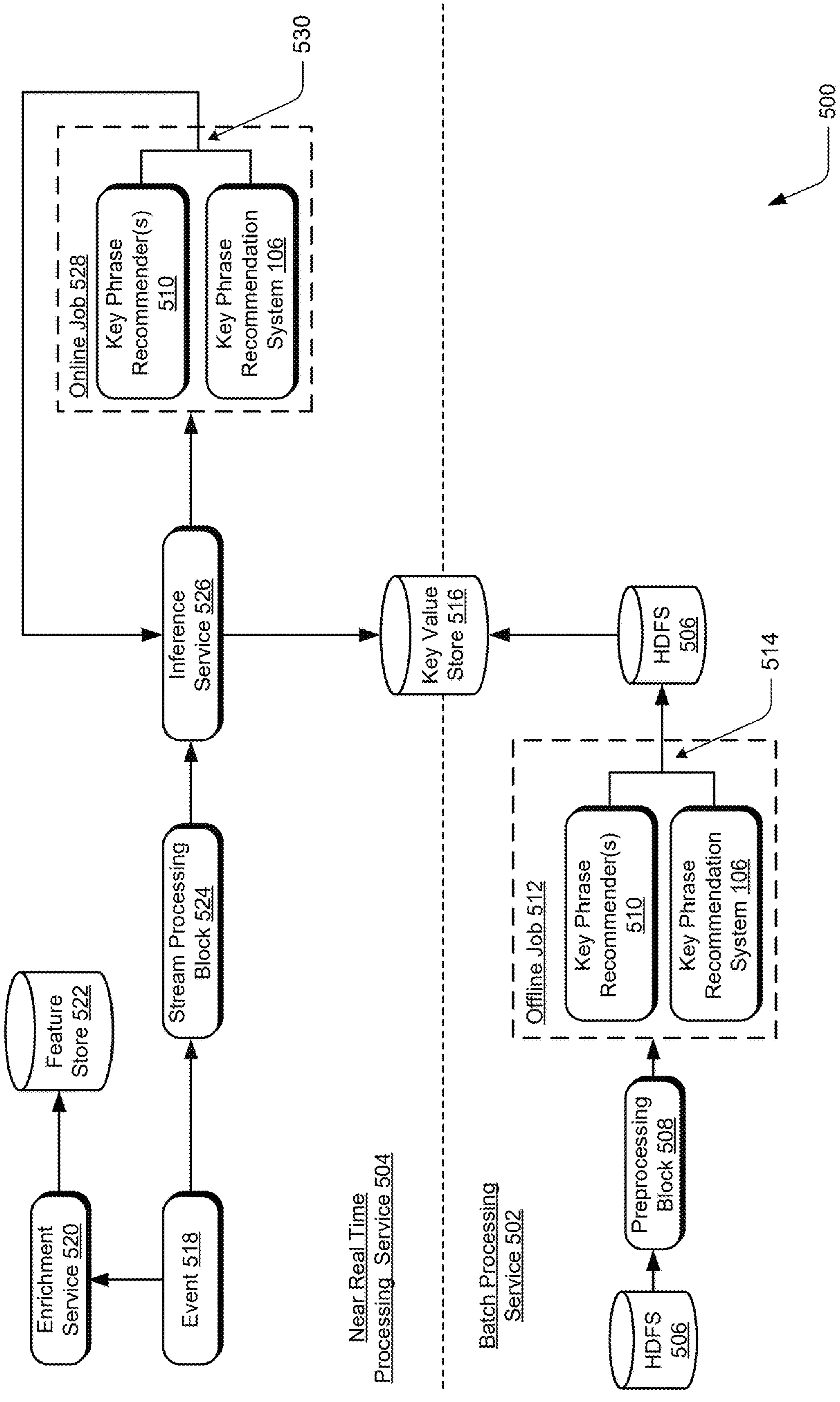
FIG. 5 is an example of a serving architecture that is operable to employ techniques described herein.

FIG. 5 is an example 500 of a serving architecture that is operable to employ techniques described herein. The example 500 includes a batch processing service 502, which is generally configured to periodically process items 118 listed via the online marketplace 112 using the key phrase recommendation system 106. For example, the batch processing service 502 periodically (e.g., daily) determines the recommended key phrases 148 for all items 118 listed via the online marketplace 112. Additionally or alternatively, the batch processing service 502 performs a daily differential. That is, the batch processing service 502 periodically (e.g., daily) determines the recommended key phrases 148 for all items 118 that are newly listed during a previous time period, and all listings 116 of items 118 that are updated/revised during the previous time period. The example 500 also includes a near real time processing service 504, which generates the recommended key phrases 148 urgently (e.g., in near real time) for an item 118 responsive to a new listing 116 being created for the item 118 or an update to an existing listing 116 for the item 118.

In accordance with the batch processing service 502, the raw data of the listings 116 of the online marketplace 112 is stored in a Hadoop Distributed File System (HDFS) 506. This data is processed by a preprocessing block 508 which is generally configured to perform one or more preprocessing operations on the raw data to format the data in a way that is processable by the key phrase recommendation system 106. By way of example, the preprocessing block 508 extracts key phrases 128 from user queries, and associates the key phrases 128 with items 118 that are engaged with when the key phrases 128 are searched, e.g., forming item 118 and key phrase 128 pairings in the dataset 130. The preprocessed data is provided as input to the key phrase recommendation system 106 and one or more key phrase recommenders 510. Broadly, the key phrase recommenders 510 are models and/or algorithms that generate key phrase recommendations using techniques and/or methods that differ from the key phrase recommendation system 106. In particular, the generation of recommended key phrases 148 is performed as part of an offline job 512, meaning that the computations are performed by a web services platform external to the service provider system 104. For example, the offline job 512 is performed by a data stream processing platform, such as Apache Flink.

As shown at 514, the results of the processing by the key phrase recommender(s) 510 and the key phrase recommendation system 106 are merged, and then stored in the HDFS 506. Once the data is fully processed (e.g., all listings 116 of the listing platform 114 are processed or all new or updated listings 116 of the listing platform 114 are processed), the data is stored in a key value store 516. For example, the item 118 is the "key" of an entry in the key value store, while the recommended key phrases 148 for the item 118 are the "values" of the entry in the key value store. When batch processing the entirety of data (e.g., all listings 116 of the listing platform 114), the batch processing service 502 additionally re-generates the tripartite graph(s) 136 in various implementations. The fast training phase (e.g., the tripartite graph construction phase) of the key phrase recommendation system 106 enables daily model refreshes, and permits the key phrase recommendation system 106 to recommend new key phrases that arise daily on the online marketplace 112.

In accordance with the near real time processing service 504, an event 518 is received defining a new listing 116 being created or an update to an existing listing 116. The raw data of the event 518 is provided to an enrichment service 520, which generally is configured enrich the raw data (e.g., to generate the real-time listing data 122 including the attributes 124), and store the enriched data in a feature store 522. In addition, the event 518 is processed by a stream processing block 524, e.g., an Apache Flink processing window. Examples of operations performable by the stream processing block 524 include grouping events 518 by time window (e.g., grouping the events 518 received within a time interval) or count window (e.g., grouping a fixed number of events 518), and filtering (i.e., removing) irrelevant events 518, e.g., update events 518 in which the updated data does not impact key phrase recommendations.

After being processed by the stream processing block 524, the event 518 triggers calling of an inference service 526, which is a machine learning inference service of the service provider system 104 designed to handle real-time data processing and model inference at scale. In particular, the inference service 526 processes the newly listed or updated item 118 as an online job 528 (e.g., the processing is performed by hardware resources of the service provider system 104) using the key phrase recommender(s) 510 and the key phrase recommendation system 106. As shown at 530, the results of the processing are merged, and the inference service 526 stores the results in the key value store 516. For instance, the inference service 526 updates the key value store 516 to include a new entry (e.g., for a newly listed item 118) or updates an entry in the key value store 516, e.g., for an updated listing 116.

In other words, both the batch processing service 502 and the near real time processing service 504 inject data (e.g., item 118 and corresponding recommended key phrases 148) in the key value store 516. Recommended key phrases 148 are served (e.g., surfaced in user interfaces) to users of the online marketplace 112 from the key value store 516. Notably, the serving architecture depicted in the example 500 is highly scalable, e.g., to billions of items 118 and hundreds of billions of key phrases 128.

Having discussed exemplary details of key phrase recommendation based on token correspondence, consider now some examples of procedures to illustrate additional aspects of the techniques.

Example Procedures

This section describes examples of procedures for graph-directed key phrase recommendation based on item similarity. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks.

Figure 6:
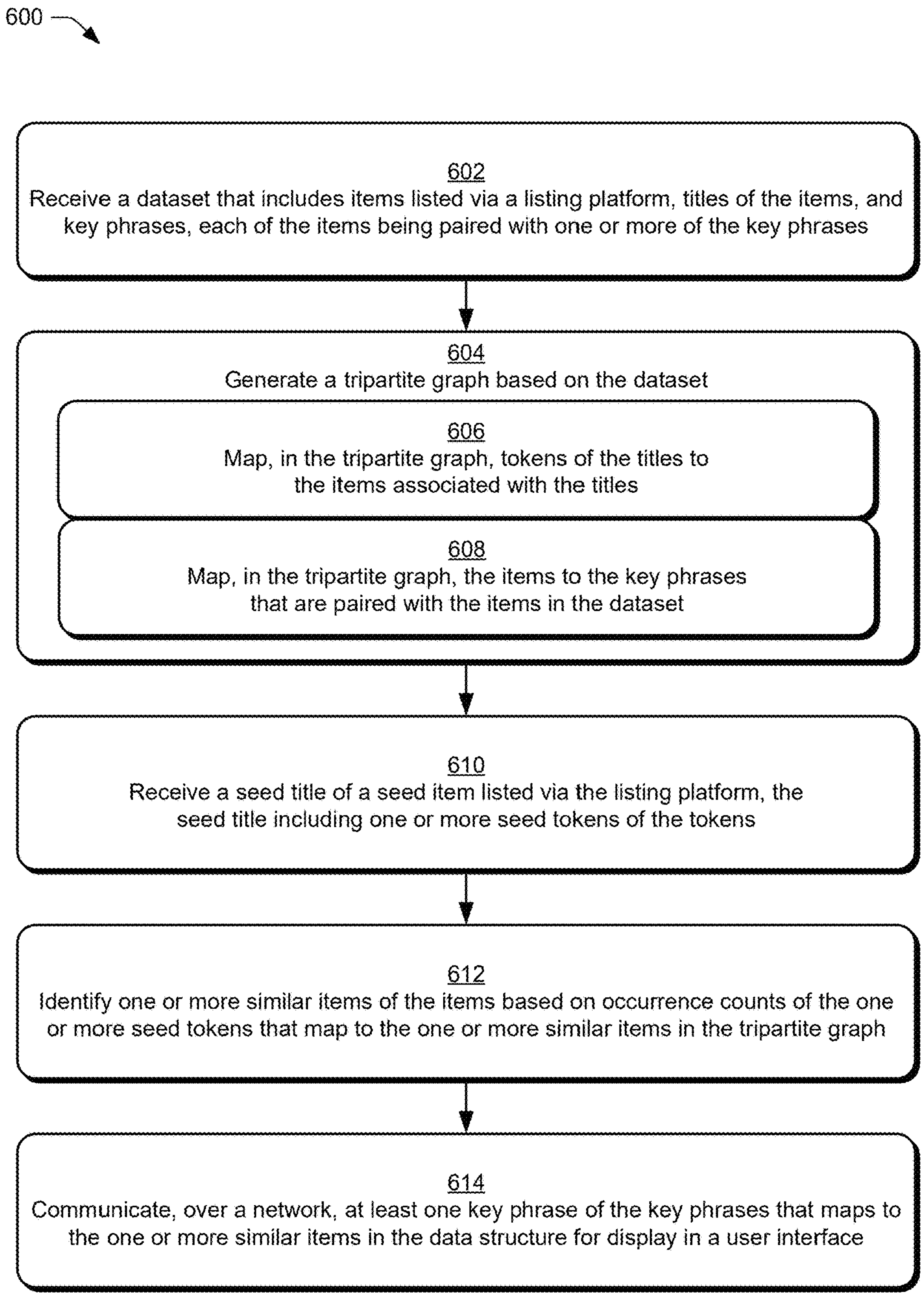
FIG. 6 depicts a procedure in an example implementation of graph-directed key phrase recommendation based on item similarity.

FIG. 6 depicts a procedure 600 in an example implementation of graph-directed key phrase recommendation based on item similarity. A dataset is received that includes items listed via a listing platform, titles of the items, and key phrases, each of the items paired with one or more of the key phrases (block 602). By way of example, the key phrase recommendation system 106 receives a dataset 130, and the dataset includes a plurality of samples 132. Each sample includes an item 118 listed via the listing platform 114 and having an item title 126, and one or more key phrases 128 paired with the item 118. In implementations, a key phrase 128 is paired with an item based on historical engagement with the item 118 responsive to the key phrase 128 being searched on online marketplace 112.

A tripartite graph is generated based on the dataset (block 604), the tripartite graph maps tokens of the titles to the items associated with the titles (block 606), and the tripartite graphs maps the items to the key phrases that are paired with the items in the dataset (block 608). For example, the graph construction module 134 receives the dataset 130 and generates a tripartite graph 136 based on the dataset 130. The tripartite graph 136 maps the title tokens 138 within the item titles 126 to the items 118 associated with the item titles 126. In addition, the tripartite graph 136 maps the items 118 to the key phrases 128 that are paired with the items 118 in the dataset 130.

A seed title of a seed item listed via the listing platform is received, and the seed title includes one or more seed tokens of the tokens (block 610). For example, the inference system 140 receives the seed item 142 having the seed title 144, and tokenizes the seed title 144 into seed tokens 146.

One or more similar items of the items are identified based on occurrence counts of the one or more seed tokens that map to the one or more similar items in the tripartite graph (block 612). Here, the inference system 140 identifies, as matching tokens, the title tokens 138 in the tripartite graph 136 that match the seed tokens 146. Furthermore, the inference system 140 traverses the tripartite graph 136 to determine occurrence counts 304 of the items 118. An occurrence count 304 of an item 118 is the number of matching tokens that map to the item 118 in the tripartite graph 136. The inference system 140 identifies, as similar items 118 to the seed item 142, the items 118 having the occurrence counts that meet an occurrence threshold.

At least one key phrase of the key phrases that maps to the one or more similar items in the data structure is communicated over a network for display in a user interface (block 614). By way of example, the ranking module 322 receives candidate key phrases 320 that are mapped to the similar items 118 in the tripartite graph 136. The ranking module 322 ranks the candidate key phrases 320 based on the occurrence counts 304, the word match ratios 308, and the multiplicity 306 values in accordance with the ranking priority 328. Next, the ranking module 322 generates, as recommended key phrases 148, a top-ranked subset of the candidate key phrases 320. The key phrase recommendation system 106 then communicates the recommended key phrases 148 to the computing device 102 for display in a user interface of the application 110.

Having described examples of procedures in accordance with one or more implementations, consider now an example of a system and device that can be utilized to implement the various techniques described herein.

Example System and Device

Figure 7:
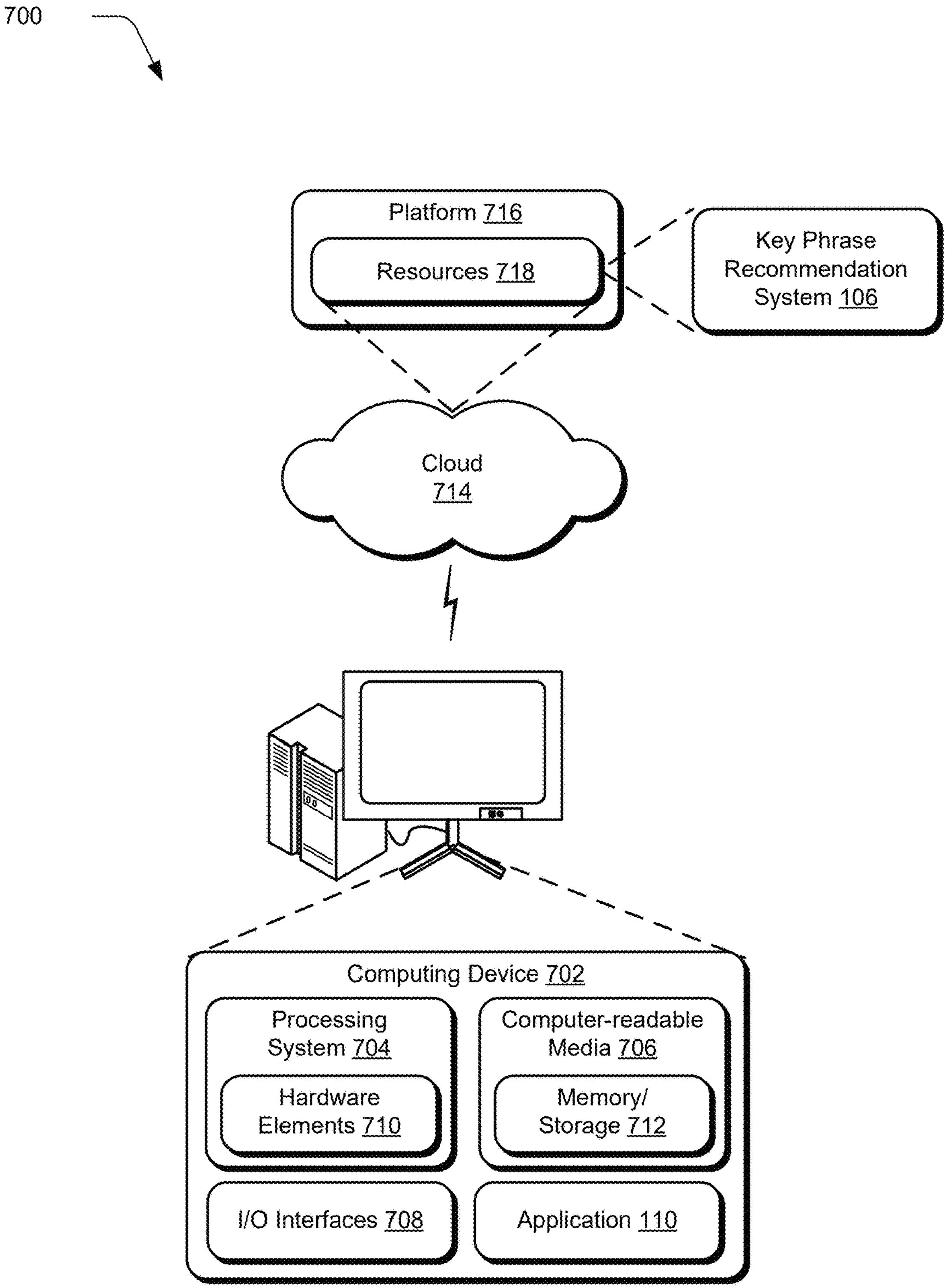
FIG. 7 illustrates an example of a system that may implement the various techniques described herein.

FIG. 7 illustrates an example of a system generally at 700 that includes an example of a computing device 702 that is representative of one or more computing systems and/or devices that may implement the various techniques described herein. This is illustrated through inclusion of the application 110 and the key phrase recommendation system 106. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage 712 may include volatile media (such as random-access memory (RAM)) and/or nonvolatile media (such as read only memory (ROM), Flash memory, optical disks, magnetic disks, and so forth). The memory/storage 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

In some aspects, the techniques described herein relate to a method implemented by at least one computing device, the method including receiving a dataset that comprises items listed via a listing platform, titles of the items, and key phrases, wherein each of the items are paired with one or more of the key phrases, mapping, in a data structure, tokens of the titles to the items associated with the titles, mapping, in the data structure, the items to the key phrases that are paired with the items in the dataset, receiving a seed title of a seed item listed via the listing platform, the seed title including one or more seed tokens of the tokens, identifying one or more similar items of the items based on occurrence counts of the one or more seed tokens that map to the one or more similar items in the data structure, and outputting at least one key phrase of the key phrases that maps to the one or more similar items in the data structure.

In some aspects, the techniques described herein relate to a method, further including pairing an item with a key phrase in the dataset based on historical engagement with the item in response to the key phrase being searched via the listing platform.

In some aspects, the techniques described herein relate to a method, further including generating clusters of the key phrases, each of the clusters including the key phrases mapped via the items to a same occurrence count of the one or more seed tokens in the data structure.

In some aspects, the techniques described herein relate to a method, further including associating a key phrase with a highest occurrence count of the one or more seed tokens mapped to a single item to which the key phrase is mapped in the data structure.

In some aspects, the techniques described herein relate to a method, wherein identifying the one or more similar items includes filtering the clusters having the occurrence counts that are below an occurrence threshold, resulting in one or more retained clusters that include the key phrases that map to the one or more similar items in the data structure.

In some aspects, the techniques described herein relate to a method, further including setting the occurrence threshold at a value at which the filtering produces a number of the key phrases in the one or more retained clusters that exceeds a retention threshold.

In some aspects, the techniques described herein relate to a method, wherein the data structure is a tripartite graph.

In some aspects, the techniques described herein relate to a method, further including ranking candidate key phrases of the key phrases that map to the one or more similar items in the data structure, the at least one key phrase representing a top-ranked subset of the candidate key phrases.

In some aspects, the techniques described herein relate to a method, wherein the candidate key phrases are ranked in descending order of the occurrence counts associated with respective candidate key phrases.

In some aspects, the techniques described herein relate to a method, wherein the candidate key phrases associated with a same value of the occurrence counts are ranked in descending order of percentages of phrase tokens in the respective candidate key phrases that match the one or more seed tokens.

In some aspects, the techniques described herein relate to a method, wherein the candidate key phrases having same values of the occurrence counts and the percentages are ranked in descending order of quantities of the one or more similar items to which the respective candidate key phrases are mapped in the data structure.

In some aspects, the techniques described herein relate to a system including one or more processors, and memory storing instructions that, when executed by the one or more processors, cause the system to receive a dataset that comprises items listed via a listing platform, titles of the items, and key phrases, wherein each of the items are paired with one or more of the key phrases, map, in a tripartite graph, tokens of the titles to the items associated with the titles, map, in the tripartite graph, the items to the key phrases that are paired with the items in the dataset, receive a seed title of a seed item listed via the listing platform, the seed title including one or more seed tokens of the tokens, identify one or more similar items of the items based on occurrence counts of the one or more seed tokens connected to the one or more similar items in the tripartite graph, and output at least one key phrase of the key phrases connected to the one or more similar items in the tripartite graph.

In some aspects, the techniques described herein relate to a system, wherein the instructions further cause the system to pair an item with a key phrase in the dataset based on historical engagement with the item in response to the key phrase being searched via the listing platform.

In some aspects, the techniques described herein relate to a system, wherein the instructions further cause the system to generate clusters of the key phrases, each of the clusters including the key phrases connected via the items to a same occurrence count of the one or more seed tokens in the tripartite graph.

In some aspects, the techniques described herein relate to a system, wherein the instructions further cause the system to associate a key phrase with a highest occurrence count of the one or more seed tokens connected to a single item to which the key phrase is connected in the tripartite graph.

In some aspects, the techniques described herein relate to a system, wherein the instructions further cause the system to filter the clusters having the occurrence counts that are below a threshold, resulting in one or more retained clusters that include the key phrases connected to the one or more similar items in the tripartite graph.

In some aspects, the techniques described herein relate to a system, wherein the instructions further cause the system to rank candidate key phrases of the key phrases connected to the one or more similar items in the tripartite graph based on the occurrence counts, percentages of phrase tokens in respective candidate key phrases that match the one or more seed tokens, and quantities of the one or more similar items to which the respective candidate key phrases are mapped in the tripartite graph, wherein the at least one key phrase represents a top-ranked subset of the candidate key phrases.

In some aspects, the techniques described herein relate to a non-transitory computer-readable storage medium storing instructions that, when executed by one or more processors, cause the one or more processors to perform operations including receiving a dataset that comprises items listed via a listing platform, titles of the items, and key phrases, wherein each of the items are paired with one or more of the key phrases, mapping, in a data structure, tokens of the titles to the items associated with the titles, mapping, in the data structure, the items to the key phrases that are paired with the items in the dataset, receiving a seed title of a seed item listed via the listing platform, the seed title including one or more seed tokens of the tokens, determining occurrence counts of the key phrases, an occurrence count of a key phrase representing a highest number of the one or more seed tokens mapped to a single item to which the key phrase is mapped in the data structure, and outputting the key phrases as ranked based, in part, on the occurrence counts.

In some aspects, the techniques described herein relate to a non-transitory computer-readable storage medium, the operations further including pairing an item with a key phrase in the dataset based on historical engagement with the item in response to the key phrase being searched via the listing platform.

In some aspects, the techniques described herein relate to a non-transitory computer-readable storage medium, wherein the data structure is a tripartite graph.

CONCLUSION

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A method implemented by at least one computing device, the method comprising:

receiving a dataset that comprises items listed via a listing platform, titles of the items, and key phrases, wherein each of the items are paired with one or more of the key phrases;

tokenizing the titles into title tokens;

generating a tripartite graph by:

connecting, via a first set of edges of the tripartite graph, the title tokens to the items, a respective title token being connected to an item if a title of the item includes the respective title token; and connecting, via a second set of edges of the tripartite graph, the items to the key phrases, a respective key phrase being connected to an item if the respective key phrase is paired with the item in the dataset;

storing the tripartite graph in memory in compressed sparse row format;

receiving a seed title of a seed item listed via the listing platform, the seed title including one or more seed tokens;

traversing the tripartite graph in the memory to identify matching tokens of the title tokens that match the one or more seed tokens and assign occurrence counts to the items, an occurrence count of a respective item representing a number of the matching tokens that are connected to the respective item via the first set of edges;

identifying one or more similar items of the items having the occurrence counts that meet a threshold; and outputting at least one key phrase of the key phrases that maps to the one or more similar items via the second set of edges in the tripartite graph.

2. The method of claim 1, further comprising pairing an item with a key phrase in the dataset based on historical engagement with the item in response to the key phrase being searched via the listing platform.

3. The method of claim 1, further comprising generating clusters of the key phrases, each of the clusters including the key phrases mapped via the items to a same occurrence count of the one or more seed tokens in the tripartite graph.

4. The method of claim 3, further comprising associating a key phrase with a highest occurrence count of the one or more seed tokens mapped to a single item to which the key phrase is mapped in the tripartite graph.

5. The method of claim 3, wherein identifying the one or more similar items comprises filtering the clusters having the occurrence counts that are below an occurrence threshold, resulting in one or more retained clusters that include the key phrases that map to the one or more similar items in the tripartite graph.

6. The method of claim 5, further comprising setting the occurrence threshold at a value at which the filtering produces a number of the key phrases in the one or more retained clusters that exceeds a retention threshold.

7. The method of claim 1, further comprising ranking candidate key phrases of the key phrases that map to the one or more similar items in the tripartite graph, the at least one key phrase representing a top-ranked subset of the candidate key phrases.

8. The method of claim 7, wherein the candidate key phrases are ranked in descending order of the occurrence counts associated with respective candidate key phrases.

9. The method of claim 8, wherein the candidate key phrases associated with a same value of the occurrence counts are ranked in descending order of percentages of phrase tokens in the respective candidate key phrases that match the one or more seed tokens.

10. The method of claim 9, wherein the candidate key phrases having same values of the occurrence counts and the percentages are ranked in descending order of quantities of the one or more similar items to which the respective candidate key phrases are mapped in the tripartite graph.

11. A system comprising:

one or more processors; and memory storing instructions that, when executed by the one or more processors, cause the system to:

receive a dataset that comprises items listed via a listing platform, titles of the items, and key phrases, wherein each of the items are paired with one or more of the key phrases;

tokenize the titles into title tokens;

generate a tripartite graph by:

connecting, via a first set of edges of the tripartite graph, the title tokens to the items, a respective title token being connected to an item if a title of the item includes the respective title token; and connecting, via a second set of edges of the tripartite graph, the items to the key phrases, a respective key phrase being connected to an item if the respective key phrase is paired with the item in the dataset;

store the tripartite graph in the memory in compressed sparse row format;

receive a seed title of a seed item listed via the listing platform, the seed title including one or more seed tokens;

traverse the tripartite graph in the memory to identify matching tokens of the title tokens that match the one or more seed tokens and assign occurrence counts to the items, an occurrence count of a respective item representing a number of the matching tokens that are connected to the respective item via the first set of edges;

identify one or more similar items of the items having the occurrence counts meet a threshold; and output at least one key phrase of the key phrases connected to the one or more similar items via the second set of edges in the tripartite graph.

12. The system of claim 11, wherein the instructions further cause the system to pair an item with a key phrase in the dataset based on historical engagement with the item in response to the key phrase being searched via the listing platform.

13. The system of claim 11, wherein the instructions further cause the system to generate clusters of the key phrases, each of the clusters including the key phrases connected via the items to a same occurrence count of the one or more seed tokens in the tripartite graph.

14. The system of claim 13, wherein the instructions further cause the system to associate a key phrase with a highest occurrence count of the one or more seed tokens connected to a single item to which the key phrase is connected in the tripartite graph.

15. The system of claim 13, wherein the instructions further cause the system to filter the clusters having the occurrence counts that are below a threshold, resulting in one or more retained clusters that include the key phrases connected to the one or more similar items in the tripartite graph.

16. The system of claim 11, wherein the instructions further cause the system to rank candidate key phrases of the key phrases connected to the one or more similar items in the tripartite graph based on the occurrence counts, percentages of phrase tokens in respective candidate key phrases that match the one or more seed tokens, and quantities of the one or more similar items to which the respective candidate key phrases are mapped in the tripartite graph, wherein the at least one key phrase represents a top-ranked subset of the candidate key phrases.

17. A non-transitory computer-readable storage medium storing instructions that, when executed by one or more processors, cause the one or more processors to perform operations comprising:

receiving a dataset that comprises items listed via a listing platform, titles of the items, and key phrases, wherein each of the items are paired with one or more of the key phrases;

tokenizing the titles into title tokens;

generating a tripartite graph by:

connecting, via a first set of edges of the tripartite graph, the title tokens to the items, a respective title token being connected to an item if a title of the item includes the respective title token; and connecting, via a second set of edges of the tripartite graph, the items to the key phrases, a respective key phrase being connected to an item if the respective key phrase is paired with the item in the dataset;

storing the tripartite graph in memory in compressed sparse row format;

receiving a seed title of a seed item listed via the listing platform, the seed title including one or more seed tokens;

traversing the tripartite graph in the memory to identify matching tokens of the title tokens that match the one or more seed tokens and assign occurrence counts to the items, an occurrence count of a respective item representing a number of the matching tokens that are connected to the respective item via the first set of edges; and outputting the key phrases as ranked based, in part, on the occurrence counts.

18. The non-transitory computer-readable storage medium of claim 17, the operations further comprising pairing an item with a key phrase in the dataset based on historical engagement with the item in response to the key phrase being searched via the listing platform.

19. The method of claim 1, wherein each unique title token of the title tokens is a vertex in the tripartite graph.

20. The method of claim 1, further comprising performing the receiving the seed title, the traversing the tripartite graph, the identifying the one or more similar items, and the outputting the at least one key phrase for a plurality of seed items in parallel by processing different seed items on different threads of execution using single instruction, multiple data (SIMD) vectorization.

* * * * *